US006583188B2

(12) United States Patent
Chaudhary et al.

(10) Patent No.: US 6,583,188 B2
(45) Date of Patent: Jun. 24, 2003

(54) GRAFTED THERMOPLASTIC COMPOSITIONS AND FABRICATED ARTICLES THEREFROM

(75) Inventors: Bharat I. Chaudhary, Pearland, TX (US); Thoi H. Ho, Lake Jackson, TX (US); Thomas Oswald, Lake Jackson, TX (US); Jennifer DellaMea, Lake Jackson, TX (US)

(73) Assignee: The Dow Chemical Company, Midland, MI (US)

( * ) Notice: Subject to any disclaimer, the term of this patent is extended or adjusted under 35 U.S.C. 154(b) by 0 days.

(21) Appl. No.: 10/090,536

(22) Filed: Mar. 4, 2002

(65) Prior Publication Data

US 2002/0151609 A1 Oct. 17, 2002

Related U.S. Application Data

(62) Division of application No. 09/728,245, filed on Dec. 1, 2000.
(60) Provisional application No. 60/168,702, filed on Dec. 3, 1999.

(51) Int. Cl.⁷ ............................... C08J 9/00; C08J 9/20
(52) U.S. Cl. ............................ 521/60; 521/79; 521/81; 521/134; 521/139
(58) Field of Search .................. 521/60, 79, 81, 521/134, 139

(56) References Cited

U.S. PATENT DOCUMENTS

| | | | |
|---|---|---|---|
| 3,336,268 A | 8/1967 | Cox | 260/79.3 |
| 3,530,108 A | 9/1970 | Oppenlander | 260/93.7 |
| 3,644,230 A | 2/1972 | Cronin | 260/2.5 |
| 4,076,698 A | 2/1978 | Anderson et al. | 526/348.6 |
| 4,214,054 A | 7/1980 | Watanabe et al. | 521/95 |
| 4,311,628 A | 1/1982 | Abdou-Sabet et al. | 260/33.6 |
| 4,323,528 A | 4/1982 | Collins | 264/53 |
| 5,703,187 A | 12/1997 | Timmers | 526/282 |
| 5,817,705 A | 10/1998 | Wilkes et al. | 521/79 |
| 5,869,591 A | 2/1999 | McKay et al. | 526/347 |
| 5,977,271 A | 11/1999 | McKay et al. | 526/170 |
| 6,054,544 A | 4/2000 | Finlayson et al. | 526/348 |
| 6,124,370 A | 9/2000 | Walton et al. | 521/143 |

FOREIGN PATENT DOCUMENTS

| | | | |
|---|---|---|---|
| EP | 0 416 815 | 3/1991 | C08F/10/00 |
| WO | 94/00500 | 1/1994 | C08F/10/00 |
| WO | 95/32095 | 11/1995 | B32B/27/32 |

OTHER PUBLICATIONS

J. C. Randall, *Polymer Sequence Determination, Carbon–13 NMR Method,* 1977, pp. 71–78.

*Primary Examiner*—Morton Foelak

(57) ABSTRACT

This invention describes grafted blend compositions, processes for their preparation and fabricated articles, especially foams therefrom. The blends exhibit enhanced melt strength, melt elongation greater than or equal to about 20 mm/s, increased upper service temperature, increased modulus, and increased hardness. The grafted blend compositions have little or no high shear viscosity increase over a corresponding polymer of the same chemical composition absent the coupling agent.

19 Claims, No Drawings

GRAFTED THERMOPLASTIC COMPOSITIONS AND FABRICATED ARTICLES THEREFROM

CROSS-REFERENCE TO RELATED APPLICATIONS

This application is a division of U.S. patent application Ser. No. 09/728,245, filed Dec. 1, 2000 which claims the benefit of U.S. Provisional Application No. 60/168,702 filed on Dec. 3, 1999 in the name of Bharat I. Chaudhary et al.

STATEMENT REGARDING FEDERALLY SPONSERED RESEARCH OF DEVEOLPMENT

Not Applicable

FIELD OF THE INVENTION

The present invention relates to grafted thermoplastic blend compositions and articles fabricated therefrom. The grafting of the polymers generally results in improvements in one or more of melt strength, hardness, modulus, upper service temperature in the resulting blends, over and above what is observed for the corresponding non-grafted blends. Furthermore the grafted blends may in turn be blended with additional thermoplastic polymers to further enhance one or more other properties. The various grafted blend compositions are useful in the preparation of a variety of fabricated articles including, but not limited to, foams, films, fibers, extrusion coatings, calandered and molded articles.

BACKGROUND OF THE INVENTION

Cross-linking or coupling of polymers has been used as a method of rheology modification of the polymer. As used herein, the term "rheology modification" means change in melt viscosity of a polymer as determined by dynamic mechanical spectroscopy (DMS). Cross-linking is typically employed to increase the melt strength of the polymer while maintaining the high shear viscosity (that is viscosity measured at a shear rate of 100 rad/sec by DMS). Thus a molten cross-linked polymer exhibits more resistance to stretching during elongation at low shear conditions (that is viscosity measured at a shear of 0.1 rad/sec by DMS) and does not sacrifice the output at high shear conditions.

Various coupling agents may be employed to rheology modify and graft polymers. Such coupling agents include peroxides, silanes, and azides. Use of poly(sulfonyl azide) to react with polymers is known, for instance the teachings of U.S. Pat. Nos. 3,058,944; 3,336,268; and 3,530,108 include the reaction of certain poly(sulfonyl azide) compounds with isotactic polypropylene or other polyolefins by nitrene insertion into C—H bonds. The product reported in U.S. Pat. No. 3,058,944 is crosslinked. The product reported in U.S. Pat. No. 3,530,108 is foamed and cured with cycloalkane-di (sulfonyl azide) of a given formula. In U.S. Pat. No. 3,336,268 the resulting reaction products are referred to as "bridged polymers" because polymer chains are "bridged" with sulfonamide bridges. The disclosed process includes a mixing step such as milling or mixing of the sulfonylazide and polymer in solution or dispersion then a heating step where the temperature is sufficient to decompose the sulfonylazide (100° C. to 225° C. depending on the azide decomposition temperature). The starting polypropylene polymer for the claimed process has a molecular weight of at least 275,000. Blends taught in U.S. Pat. No. 3,336,268 have up to about 25 percent ethylene propylene elastomer. Similarly, the teachings of Canadian patent 797,917 include rheology modification using from about 0.001 to 0.075 weight percent polysulfonyl azide to modify homopolymer polyethylene and its blend with polyisobutylene.

It would be highly desirable to have a polymer composition of enhanced melt strength, melt elongation greater than or equal to about 20 mm/s, increased upper service temperature, increased modulus, and increased hardness. Preferably, the polymer compositions would have little or no high shear viscosity increase over a corresponding polymer of the same chemical composition absent coupling agent.

In particular, it would be highly desirable to have a polymer composition of enhanced melt strength, and melt elongation greater than or equal to about 20 mm/s, that can be used to fabricate various articles including foams. Such foams should exhibit at least one of, (1) increased upper service temperature, (2) increased compressive strength at a specific foam density, or (3) increased hardness.

BRIEF SUMMARY OF THE INVENTION

This invention describes grafted blend compositions, processes for their preparation and fabricated articles, especially foams therefrom. The blends exhibit enhanced melt strength, melt elongation greater than or equal to about 20 mm/s, increased upper service temperature, increased modulus, and increased hardness. The grafted blend compositions have little or no high shear viscosity increase over a corresponding polymer of the same chemical composition absent the coupling agent.

DETAILED DESCRIPTION OF THE INVENTION

Definitions

All references herein to elements or metals belonging to a certain Group refer to the Periodic Table of the Elements published and copyrighted by CRC Press, Inc., 1989. Also any reference to the Group or Groups shall be to the Group or Groups as reflected in this Periodic Table of the Elements using the IUPAC system for numbering groups.

Any numerical values recited herein include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, preferably from 20 to 80, more preferably from 30 to 70, it is intended that values such as 15 to 85, 22 to 68, 43 to 51, 30 to 32 etc. are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner.

The term "interpolymer" is used herein to indicate a polymer wherein at least two different monomers are polymerized to make the interpolymer. This includes copolymers, terpolymers, etc.

The term "melt processing" is used to mean any process in which the polymer is softened or melted, such as extrusion, pelletizing, molding, thermoforming, film blowing, compounding in polymer melt form, fiber spinning, and the like.

The term "melt strength" refers to the maximum force attained before significant draw resonance or breakage occurs when pulling strands of molten polymers at constant acceleration until draw resonance or breakage occurred. The velocity at which draw resonance or breakage occurred is defined as the "melt elongation" (the test method is described herein). Unless otherwise specified, both melt strength and melt elongation are measured at 190° C.

As used herein the term "grafted blend composition" means a polymer blend composition further comprising a coupling agent, with the proviso that the resulting grafted blend has a gel content (as determined in accordance with ASTM D-2765–84) which is 50 percent or less, preferably 40 percent or less, more preferably 30 percent or less, even more preferably 20 percent or less, most preferably 10 percent or less.

As used herein the term "alkenyl aromatic homopolymers, or copolymers" include homopolymers and copolymers derived from alkenyl aromatic compounds such as styrene, alphamethylstyrene, ethylstyrene, vinyl benzene, vinyl toluene, chlorostyrene, and bromostyrene. A preferred alkenyl aromatic polymer is polystyrene. Minor amounts of monoethylenically unsaturated compounds such as $C_{2-6}$ alkyl acids and esters, ionomeric derivatives, and $C_{4-6}$ dienes may be copolymerized with alkenyl aromatic compounds. Examples of copolymerizable compounds include acrylic acid, methacrylic acid, ethacrylic acid, maleic acid, itaconic acid, acrylonitrile, maleic anhydride, methyl acrylate, ethyl acrylate, isobutyl acrylate, n-butyl acrylate, methyl methacrylate, vinyl acetate and butadiene.

For purposes of this invention, an alkenyl aromatic polymer is a melt-processable polymer or melt processable impact-modified polymer having at least 50%, preferably at least about 70% and most preferably at least 90% of its weight in the form of polymerized vinyl aromatic monomers as represented by the structure:

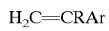

wherein R is hydrogen or an alkyl radical that preferably has no more than three carbon atoms and Ar is an aromatic group. R is preferably hydrogen or methyl, most preferably hydrogen. Suitable aromatic groups Ar include phenyl and naphthyl groups. The aromatic group Ar may be substituted. Halogen (such as Cl, F, Br), alkyl (especially $C_1$–$C_4$ alkyl such as methyl, ethyl, propyl and t-butyl), $C_1$–$C_4$ haloalkyl (such as chloromethyl or chloroethyl) and alkoxyl (such as methoxyl or ethoxyl) substituents are all useful. Styrene, para-vinyl toluene, α-methyl styrene, 4-methoxy styrene, t-butyl styrene, chlorostyrene, vinyl naphthalene and the like are all useful vinyl or vinylidene aromatic monomers. Most preferably, the alkenyl aromatic polymer material is comprised entirely of alkenyl aromatic monomeric units. Suitable alkenyl aromatic polymers include those derived from alkenyl aromatic compounds such as styrene, alphamethylstyrene, etc. Examples of copolymerizable compounds include acrylic acid, methacrylic acid, acrylonitrile, etc.

The alkenyl aromatic polymer may be a homopolymer of a vinyl aromatic monomer as described above. Polystyrene homopolymers are the most preferred alkenyl aromatic polymers. Interpolymers of two or more vinyl aromatic monomers are also useful.

Although not critical, the alkenyl aromatic polymer may be characterized as having a high degree of syndiotactic configuration; i.e., the aromatic groups are located alternately at opposite directions relative to the main chain consisting of carbon—carbon bonds. Homopolymers of vinyl aromatic polymers that have syndiotacticity of 75% r diad or greater or even 90% r diad or greater as measured by 13C NMR are useful herein.

The alkenyl aromatic polymer may also contain repeating units derived from one or more other monomers that are copolymerizable with the vinyl aromatic monomer. Suitable such monomers include N-phenyl maleimide; acrylamide; ethylenically unsaturated nitriles such as acrylonitrile and methacrylonitrile; ethylenically unsaturated carboxylic acids and anhydrides such as acrylic acid, methacrylic acid, fumaric anhydride and maleic anhydride; esters of ethylenically unsaturated acids such as $C_1$–$C_8$ alkyl acrylates and methacrylates, for example n-butyl acrylate and methyl methacrylate; and conjugated dienes such as butadiene or isoprene. The interpolymers of these types may be random, block or graft interpolymers. Blends of interpolymers of this type with homopolymers of a vinyl aromatic monomer can be used. For example, styrene/$C_4$–$C_8$ alkyl acrylate interpolymers and styrene-butadiene interpolymers are suitable as impact modifiers when blended into polystyrene. Such impact-modified polystyrenes are useful herein.

In addition, suitable alkenyl aromatic polymers include those modified with rubbers to improve their impact properties. The modification can be, for example, through blending, grafting or polymerization of a vinyl aromatic monomer (optionally with other monomers) in the presence of a rubber compound. Examples of suitable rubbers are homopolymers of $C_4$–$C_6$ conjugated dienes such as butadiene or isoprene; ethylene/propylene interpolymers; interpolymers of ethylene, propylene and a nonconjugated diene such as 1,6-hexadiene or ethylidene norbornene; $C_4$–$C_6$ alkyl acrylate homopolymers or interpolymers, including interpolymers thereof with a $C_1$–$C_4$ alkyl acrylate. The rubbers are conveniently prepared by anionic solution polymerization techniques or by free radical initiated solution, mass or suspension polymerization processes. Rubber polymers that are prepared by emulsion polymerization may be agglomerated to produce larger particles having a multimodal particle size distribution.

Preferred impact modified alkenyl aromatic polymers are prepared by dissolving the rubber into the vinyl aromatic monomer and any comonomers and polymerizing the resulting solution, preferably while agitating the solution so as to prepare a dispersed, grafted, impact modified polymer having rubber domains containing occlusions of the matrix polymer dispersed throughout the resulting polymerized mass. In such products, polymerized vinyl aromatic monomer forms a continuous polymeric matrix. Additional quantities of rubber polymer may be blended into the impact modified polymer if desired.

Commercial HIPS (high impact polystyrene), ABS (acrylonitrile-butadiene-styrene) and SAN (styrene-acrylonitrile) resins that are melt processable are also useful as blend components of the present invention.

The alkenyl aromatic polymer has a molecular weight such that it can be melt processed with a blowing agent to form a cellular foam structure. A number average molecular weight of about 60,000 to about 350,000, preferably from about 100,000 to about 325,000 is suitable. In the case of an impact-modified polymer, these molecular weight numbers refer to molecular weight of the matrix polymer (i.e., the continuous phase polymer of an alkenyl aromatic monomer).

The term "substantially random" (in the substantially random interpolymer comprising polymer units derived from ethylene and one or more α-olefin monomers with one or more vinyl or vinylidene aromatic monomers and/or aliphatic or cycloaliphatic vinyl or vinylidene monomers) as used herein means that the distribution of the monomers of said interpolymer can be described by the Bernoulli statistical model or by a first or second order Markovian statistical model, as described by J. C. Randall in POLYMER SEQUENCE DETERMINATION, Carbon -13 NMR Method, Academic Press New York, 1977, pp. 71–78. Preferably, substantially random interpolymers do not contain more than 15 percent of the total amount of vinyl aromatic monomer in blocks of vinyl aromatic monomer of more than 3 units. More preferably, the interpolymer is not characterized by a high degree of either isotacticity or syndiotacticity. This means that in the carbon$^{-13}$ NMR spectrum of the substantially random interpolymer the peak areas corresponding to the main chain methylene and methine carbons representing either meso diad sequences or racemic diad sequences should not exceed 75 percent of the total peak area of the main chain methylene and methine carbons.

The "substantially random interpolymers" can be prepared by polymerizing i) ethylene and/or one or more α-olefin monomers and ii) one or more vinyl or vinylidene aromatic monomers and/or one or more sterically hindered aliphatic or cycloaliphatic vinyl or vinylidene monomers, and optionally iii) other polymerizable ethylenically unsaturated monomer(s). Suitable α-olefins includes for example, α-olefins containing from 3 to about 20, preferably from 3 to about 12, more preferably from 3 to about 8 carbon atoms. Particularly suitable are ethylene, propylene, butene-1,4-methyl-1-pentene, hexene-1 or octene-1 or ethylene in combination with one or more of propylene, butene-1,4-methyl-1-pentene, hexene-1 or octene-1. These α-olefins do not contain an aromatic moiety.

Other optional polymerizable ethylenically unsaturated monomer(s) include norbornene and $C_{1-10}$ alkyl or $C_{6-10}$ aryl substituted norbornenes, with an exemplary interpolymer being ethylene/styrene/norbornene.

Suitable vinyl or vinylidene aromatic monomers, which can be employed to prepare the interpolymers, include, for example, those represented by the following formula:

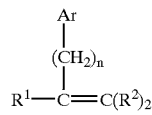

wherein $R^1$ is selected from the group of radicals consisting of hydrogen and alkyl radicals containing from 1 to about 4 carbon atoms, preferably hydrogen or methyl; each $R^2$ is independently selected from the group of radicals consisting of hydrogen and alkyl radicals containing from 1 to about 4 carbon atoms, preferably hydrogen or methyl; Ar is a phenyl group or a phenyl group substituted with from 1 to 5 substituents selected from the group consisting of halo, $C_{1-4}$-alkyl, and $C_{1-4}$-haloalkyl; and n has a value from zero to about 4, preferably from zero to 2, most preferably zero. Exemplary vinyl or vinylidene aromatic monomers include styrene, vinyl toluene, α-methylstyrene, t-butyl styrene, chlorostyrene, including all isomers of these compounds, and the like. Particularly suitable such monomers include styrene and lower alkyl- or halogen-substituted derivatives thereof. Preferred monomers include styrene, α-methyl styrene, the lower alkyl-($C_1$–$C_4$) or phenyl-ring substituted derivatives of styrene, such as for example, ortho-, meta-, and para-methylstyrene, the ring halogenated styrenes, para-vinyl toluene or mixtures thereof, and the like. A more preferred aromatic vinyl monomer is styrene.

By the term "sterically hindered aliphatic or cycloaliphatic vinyl or vinylidene compounds", it is meant addition polymerizable vinyl or vinylidene monomers corresponding to the formula:

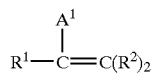

wherein $A^1$ is a sterically bulky, aliphatic or cycloaliphatic substituent of up to 20 carbons, $R^1$ is selected from the group of radicals consisting of hydrogen and alkyl radicals containing from 1 to about 4 carbon atoms, preferably hydrogen or methyl; each $R^2$ is independently selected from the group of radicals consisting of hydrogen and alkyl radicals containing from 1 to about 4 carbon atoms, preferably hydrogen or methyl; or alternatively $R^1$ and $A^1$ together form a ring system. Preferred aliphatic or cycloaliphatic vinyl or vinylidene compounds are monomers in which one of the carbon atoms bearing ethylenic unsaturation is tertiary or quaternary substituted. Examples of such substituents include cyclic aliphatic groups such as cyclohexyl, cyclohexenyl, cyclooctenyl, or ring alkyl or aryl substituted derivatives thereof, tert-butyl, norbornyl, and the like. Most preferred aliphatic or cycloaliphatic vinyl or vinylidene compounds are the various isomeric vinyl-ring substituted derivatives of cyclohexene and substituted cyclohexenes, and 5-ethylidene-2-norbornene. Especially suitable are 1-, 3-, and 4-vinylcyclohexene. Simple linear non-branched α-olefins including for example, α-olefins containing from 3 to about 20 carbon atoms such as propylene, butene-1,4-methyl-1-pentene, hexene-1 or octene-1 are not examples of sterically hindered aliphatic or cycloaliphatic vinyl or vinylidene compounds.

The substantially random interpolymers include the pseudo-random interpolymers as described in EP-A-0,416, 815 by James C. Stevens et al. and U.S. Pat. No. 5,703,187 by Francis J. Timmers, both of which are incorporated herein by reference in their entirety. The substantially random interpolymers also include the substantially random terpolymers as described in U.S. Pat. No. 5,872,201 which is also incorporated herein by reference in its entirety. The substantially random interpolymers are best prepared by polymerizing a mixture of polymerizable monomers in the presence of one or more metallocene or constrained geometry catalysts in combination with various cocatalysts. Preferred operating conditions for the polymerization reactions are pressures from atmospheric up to 3000 atmospheres and temperatures from −30° C. to 200° C. Polymerizations and unreacted monomer removal at temperatures above the autopolymerization temperature of the respective monomers may result in formation of some amounts of homopolymer polymerization products resulting from free radical polymerization.

Examples of suitable catalysts and methods for preparing the substantially random interpolymers are disclosed in U.S. application Ser. No. 702,475, filed May 20, 1991 (EP-A-514,828); as well as U.S. Pat. Nos.: 5,055,438; 5,057,475; 5,096,867; 5,064,802; 5,132,380; 5,189,192; 5,321,106; 5,347,024; 5,350,723; 5,374,696; 5,399,635; 5,470,993; 5,703,187; and 5,721,185 all of which patents and applications are incorporated herein by reference.

The substantially random α-olefin/vinyl aromatic interpolymers can also be prepared by the methods described in JP 07/278230 employing compounds shown by the general formula

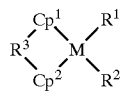

where $Cp^1$ and $Cp^2$ are cyclopentadienyl groups, indenyl groups, fluorenyl groups, or substituents of these, independently of each other; $R^1$ and $R^2$ are hydrogen atoms, halogen atoms, hydrocarbon groups with carbon numbers of 1–12, alkoxyl groups, or aryloxyl groups, independently of each other; M is a group IV metal, preferably Zr or Hf, most preferably Zr; and $R^3$ is an alkylene group or silanediyl group used to cross-link $Cp^1$ and $Cp^2$).

The substantially random α-olefin/vinyl aromatic interpolymers can also be prepared by the methods described by John G. Bradfute et al. (W. R. Grace & Co.) in WO 95/32095; by R. B. Pannell (Exxon Chemical Patents, Inc.) in WO 94/00500; and in *Plastics Technology*, p. 25 (September 1992), all of which are incorporated herein by reference in their entirety.

Also suitable are the substantially random interpolymers which comprise at least one α-olefin/vinyl aromatic/vinyl aromatic/α-olefin tetrad disclosed in U.S. application Ser. No. 08/708,869 filed Sep. 4, 1996 and WO 98/09999 both by Francis J. Timmers et al. These interpolymers contain additional signals in their carbon-13 NMR spectra with intensities greater than three times the peak to peak noise. These signals appear in the chemical shift range 43.70–44.25 ppm and 38.0-38.5 ppm. Specifically, major peaks are observed at 44.1, 43.9, and 38.2 ppm. A proton test NMR experiment indicates that the signals in the chemical shift region 43.70–44.25 ppm are methine carbons and the signals in the region 38.0–38.5 ppm are methylene carbons.

Further preparative methods for the interpolymers used in the present invention have been described in the literature. Longo and Grassi (*Makromol. Chem., Volume* 191, pages 2387 to 2396 [1990]) and D'Anniello et al. (Journal of Applied Polymer Science, Volume 58, pages 1701–1706 [1995]) reported the use of a catalytic system based on methylalumoxane (MAO) and cyclopentadienyltitanium trichloride ($CpTiCl_3$) to prepare an ethylene-styrene copolymer. Xu and Lin (*Polymer Preprints, Am. Chem. Soc., Div. Polym. Chem.*) Volume 35, pages 686,687 [1994]) have reported copolymerization using a $MgCl_2/TiCl_4/NdCl_3/Al$ $(iBu)_3$ catalyst to give random copolymers of styrene and propylene. Lu et al (*Journal of Applied Polymer Science*, Volume 53, pages 1453 to 1460 [1994]) have described the copolymerization of ethylene and styrene using a $TiCl_4/NdCl_3/MgCl_2/Al(Et)_3$ catalyst. Sernetz and Mulhaupt, (*Macromol. Chem. Phys.*, v. 197, pp. 1071–1083, 1997) have described the influence of polymerization conditions on the copolymerization of styrene with ethylene using $Me_2Si$ $(Me_4Cp)(N\text{-tert-butyl})TiCl_2$/methylaluminoxane Ziegler-Natta catalysts. Copolymers of ethylene and styrene produced by bridged metallocene catalysts have been described by Arai, Toshiaki and Suzuki (*Polymer Preprints, Am. Chem. Soc., Div. Polym. Chem.*) Volume 38, pages 349, 350 [1997]) and in U.S. Pat. No. 5,652,315, issued to Mitsui Toatsu Chemicals, Inc. The manufacture of α-olefin/vinyl aromatic monomer interpolymers such as propylene/styrene and butene/styrene are described in U.S. Pat. No. 5,244,996, issued to Mitsui Petrochemical Industries Ltd or U.S. Pat. No. 5,652,315 also issued to Mitsui Petrochemical Industries Ltd or as disclosed in DE 197 11 339 A1 to Denki Kagaku Kogyo KK. All the above methods disclosed for preparing the interpolymer component are incorporated herein by reference. Also, although of high isotacticity, the random copolymers of ethylene and styrene as disclosed in Polymer Preprints Vol 39, No. 1, March 1998 by Toru Aria et al. can also be employed as blend components for the foams of the present invention.

While preparing the substantially random interpolymer, an amount of atactic vinyl aromatic homopolymer may be formed due to homopolymerization of the vinyl aromatic monomer at elevated temperatures. The presence of vinyl aromatic homopolymer is in general not detrimental for the purposes of the present invention and can be tolerated. The vinyl aromatic homopolymer may be separated from the interpolymer, if desired, by extraction techniques such as selective precipitation from solution with a non solvent for either the interpolymer or the vinyl aromatic homopolymer. For the purpose of the present invention it is preferred that no more than 30 weight percent, preferably less than 20 weight percent based on the total weight of the interpolymers of atactic vinyl aromatic homopolymer is present.

The substantially random interpolymers comprise polymer units derived from (1) about 0.5 to about 65 mole percent of either (a) at least one vinyl or vinylidene aromatic monomer, or (b) at least one hindered aliphatic or cycloaliphatic vinyl or vinylidene monomer, or (c) a combination of at least one vinyl or vinylidene aromatic monomer and at least one hindered aliphatic or cycloaliphatic vinyl or vinylidene monomer; and (2) about 35 to about 99.5 mole percent of at least one aliphatic α-olefin having from 2 to 20 carbon atoms.

The term "olefinic polymer" as used herein means olefinic polymers comprising the aliphatic $C_2$–$C_{20}$ α-olefin homopolymers or interpolymers, or interpolymers of one or more aliphatic α-olefins and one or more non-aromatic monomers interpolymerizable therewith (such as $C_2$–$C_{20}$ α-olefins) or those aliphatic α-olefins having from 2 to 20 carbon atoms and containing polar groups. Suitable aliphatic α-olefin monomers which introduce polar groups into the polymer include, for example, ethylenically unsaturated nitriles such as acrylonitrile, methacrylonitrile, ethacrylonitrile, etc.; ethylenically unsaturated anhydrides such as maleic anhydride; ethylenically unsaturated aramides such as acrylamide, methacrylamide etc.; ethylenically unsaturated carboxylic acids (both mono- and difunctional) such as acrylic acid and methacrylic acid, etc.; esters (especially lower, e.g. $C_1$–$C_6$, alkyl esters) of ethylenically unsaturated carboxylic acids such as methyl methacrylate, ethyl acrylate, hydroxyethylacrylate, n-butyl acrylate or methacrylate, 2-ethyl-hexylacrylate etc.; ethylenically unsaturated dicarboxylic acid imides such as N-alkyl or N-aryl maleimides such as N-phenyl maleimide, etc. Preferably such monomers containing polar groups are acrylic acid, vinyl acetate, maleic anhydride and acrylonitrile. Halogen groups which can be included in the polymers from aliphatic α-olefin monomers include fluorine, chlorine and bromine; preferably such polymers are chlorinated polyethylenes (CPEs).

Preferred olefinic polymers for use in the present invention are homopolymers or interpolymers of an aliphatic, including cycloaliphatic, alpha-olefin having from 2 to 18 carbon atoms. Suitable examples are homopolymers of ethylene or propylene, and interpolymers of two or more alpha olefin monomers. Other preferred olefinic polymers are interpolymers of ethylene and one or more other α-olefins having from 3 to 8 carbon atoms. Preferred comonomers include 1-butene, 4-methyl-1-pentene, 1hexene, and 1-octene. The olefinic polymers may also contain, in addition to the alpha olefin, one or more non-aromatic monomers interpolymerizable therewith. Such additional interpolymerizable monomers include, for example, $C_4$–$C_{20}$ dienes, preferably, butadiene or ethylidene-2-norbornene.

The olefinic polymers can be further characterized by their degree of long or short chain branching and the distribution thereof. One class of olefinic polymers are the "branched ethylene homopolymers or interpolymers" generally produced by a high pressure polymerization process using a free radical initiator resulting in the traditional long chain branched low density polyethylene (LDPE). LDPE employed in the present composition usually has a density of less than 0.94 g/cc (ASTM D 792). Also included in the family of branched homopolymers or interpolymers are the ethylene-vinyl acetate copolymers (EVA), or ethylene-acrylic acid copolymers (EAA).

Another class of olefinic polymers are the "linear ethylene homopolymers or interpolymers" which have an absence of long chain branching, and include the traditional linear low density polyethylene polymers (heterogeneous LLDPE) or linear high density polyethylene polymers (HDPE) made using Ziegler polymerization processes (for example, U.S. Pat. No. 4,076,698 (Anderson et al.), sometimes called heterogeneous polymers.

Also included are the linear high density polyethylenes (HDPE) which consists mainly of long linear polyethylene chains. The HDPE employed in the present invention usually has a density of at least 0.945 grams per cubic centimeter (g/cc) as determined by ASTM D 792.

Another class of linear ethylene homopolymers or interpolymers is heterogeneous LLDPE, which when employed in the present invention generally has a density of from 0.85 to 0.97 g/cc (ASTM D 792). Preferably the LLDPE is an interpolymer of ethylene and one or more other α-olefins having from 3 to 18 carbon atoms, more preferably from 3–8 carbon atoms. Preferred comonomers include 1-butene, 4-methyl-1-pentene, 1-hexene, and 1-octene.

A further class of linear ethylene homopolymers or interpolymers is that of the uniformly branched or homogeneous polymers (e.g. homogeneous polyethylene). The homogeneous polymers contain no long chain branches and have only branches derived from the monomers (if having more than two carbon atoms). Homogeneous polymers include those made as described in U.S. Pat. No. 3,645,992 (Elston), and those made using so-called single site catalysts in a batch reactor having relatively high olefin concentrations (as described in U.S. Pat. Nos. 5,026,798 and 5,055,438 (Canich). The uniformly branched/homogeneous polymers are those polymers in which the comonomer is randomly distributed within a given interpolymer molecule and wherein the interpolymer molecules have a similar ethylene/comonomer ratio within that interpolymer.

The homogeneous LLDPE employed in the present composition generally has a density of from 0.85 to 0.94 g/cc (ASTM D 792). Preferably the LLDPE is an interpolymer of ethylene and one or more other α-olefins having from 3 to 18 carbon atoms, more preferably from 3–8 carbon atoms. Preferred comonomers include 1-butene, 4-methyl-1-pentene, 1-hexene, and 1-octene.

Another class of olefinic polymers are the substantially linear ethylene homopolymers or interpolymers. These polymers have a processability similar to LDPE, but the strength and toughness of LLDPE. The substantially linear ethylene homopolymers or interpolymers are disclosed in U.S. Pat. Nos. 5,272,236 and 5,278,272 which are incorporated herein by reference. The substantially linear ethylene homopolymers or interpolymers can be a homopolymer of $C_2$–$C_{20}$ olefins, such as ethylene, propylene, 4-methyl-1-pentene, etc., or it can be an interpolymer of ethylene with at least one $C_3$–$C_{20}$ α-olefin and/or $C_2$–$C_{20}$ acetylenically unsaturated monomer and/or $C_4$–$C_{18}$ diolefin. The polymer can also be an interpolymer of ethylene with at least one of the above $C_3$–$C_{20}$ α-olefins, diolefins and/or acetylenically unsaturated monomers in combination with other unsaturated monomers. The density of the substantially linear ethylene homopolymers or interpolymers as measured in accordance with ASTM D-792 is generally from 0.85 g/cc to 0.97 g/cc, preferably from 0.85 g/cc to 0.955 g/cc, and especially from 0.85 g/cc to 0.92 g/cc.

Also included in the class of olefinic polymers are the ultra low molecular weight ethylene polymers and ethylene/α-olefin interpolymers described in the U.S. patent application Ser. No. 784,683 entitled Ultra-Low Molecular Weight Polymers, filed Jan. 22, 1997 M. J. Guest, et al., which is incorporated herein by reference. These ethylene/α-olefin interpolymers have 12 melt indices greater than 1,000, or a number average molecular weight (Mn) less than 11,000.

Also included in the class of olefinic polymers are the various polymeric ionomer compositions including Surlyn™ (a product and trademark of Du Pont)

Especially preferred olefinic polymers comprise LDPE, HDPE, heterogeneous LLDPE, homogeneous linear polyethylene, substantially linear olefin polymer, polypropylene (PP), especially isotactic polypropylene, syndiotactic polypropylene and rubber toughened polypropylenes, or ethylene-propylene interpolymers (EP), or chlorinated polyolefins (CPE), or ethylene-vinyl acetate copolymers (EVA), the polymeric ionomer compositions or ethylene-acrylic acid copolymers, or any combination thereof.

The melt index, measured according to ASTM D-1238, Condition 190° C./2.16 kg (also known as 12), of the polymer blend component(s) used in the present invention is from about 0.01 to about 1000, preferably from about 0.01 g/10 min. to about 100, more preferably from about 0.1 to about 50, and especially from about 0.1 to 10 g/10 min.

The term "coupling agent" or "grafting agent" as used herein interchangeably means a compound or mixture of compounds used for the purposes of coupling or grafting a polymer or polymer blend. The coupling agents used to prepare the grafted compositions of the present invention include, but are not limited to peroxides, silanes, radiation, azides, phenols (as disclosed in U.S. Pat. No. 4,311,628, the disclosure of which is incorporated herein by reference), aldehyde-amine reaction products (including formaldehyde-ammonia; formaldehyde-ethylchloride-ammonia; acetaldehyde-ammonia; formaldehyde-aniline; butyraldehyde-aniline; and heptaldehyde-aniline), substituted ureas (include trimethylthiourea; diethylthiourea; dibutylthiourea; tripentylthiourea; 1,3-bis(2-benzothiazolylmercaptomethyl)urea; and N,N-diphenylthiourea), substituted guanidines (including diphenylguanidine; di-o-tolylguanidine; diphenylguanidine phthalate; and the di-o-tolylguanidine salt of dicatechol borate); substituted xanthates (including zinc ethylxanthate; sodium isopropylxanthate; butylxanthic disulfide; potassium isopropylxanthate; and zinc butylxanthate); substituted dithiocarbamates (including copper dimethyl-, zinc dimethyl-, tellurium diethyl-, cadmium dicyclohexyl-, lead dimethyl-, lead dimethyl-, selenium dibutyl-, zinc pentamethylene-, zinc didecyl-, and zinc isopropyloctyldithiocarbamate); sulfur-containing compounds, such as thiazoles (including 2-mercaptobenzothiazole, zinc mercaptothiazolyl mercaptide, 2-benzothiazolyl-N,N-diethylthiocarbamyl sulfide, and 2,2'-dithiobis(benzothiazole), imidazoles (including 2-mercaptoimidazoline and 2-mercapto-4,4,6-trimethyldihydropyrimidine), sulfonamides (including N-t-butyl-2-benzothiazole-, N-cyclohexylbenzothiazole-, N,N-diisopropylbenzothiazole-, N-(2,6-dimethylmorpholino)-2-benzothiazole-, and N,N-diethylbenzothiazole-sulfenamide) thiuramidisulfides (including N,N'-diethyl-, tetrabutyl-, N,N'-diisopropyldioctyl-, tetramethyl-, N,N'-dicyclohexyl-, and N,N'-tetralauryl-thiuramidisulfide), paraquinonedioxime, dibenzoparaquinonedioxime, sulfur; and combinations thereof. See Encyclopedia of Chemical Technology, Vol. 17, 2nd edition, Interscience Publishers, 1968; also Organic Peroxides, Daniel Seern, Vol. 1, Wiley-Interscience, 1970), The various coupling technologies are described in U.S. Pat. Nos. 5,869,591 and 5,977,271, the entire contents of both of which are herein incorporated by reference. Dual cure systems, which use a combination of heat, moisture cure, and radiation steps, may be effectively employed. Dual cure systems are disclosed and claimed in U.S. Pat. No. 6,124,370, incorporated herein by reference. For instance, it may be desirable to employ peroxide coupling agents in conjunction with silane coupling agents, peroxide coupling agents in conjunction with radiation, sulfur-containing coupling agents in conjunction with silane coupling agents, etc.

Suitable peroxides include aromatic diacyl peroxides; aliphatic diacyl peroxides; dibasic acid peroxides; ketone peroxides; alkyl peroxyesters; alkyl hydroperoxides (for example, diacetylperoxide; dibenzoylperoxide; bis-2,4-dichlorobenzoyl peroxide; di-tert-butyl peroxide; dicumylperoxide; tert-butylperbenzoate; tert-butylcumylperoxide; 2,5-bis (t-butylperoxy)-2,5-dimethylhexane; 2,5-bis (t-butylperoxy)-2,5-dimethylhexyne-3; 4,4,4',4'-tetra-(t-butylperoxy)-2,2-dicyclohexylpropane; 1,4-bis-(t-butylperoxyisopropyl)-benzene; 1,1-bis-(t-butylperoxy)-3,3,5-trimethylcyclohexane; lauroyl peroxide; succinic acid peroxide; cyclohexanone peroxide; t-butyl peracetate; butyl hydroperoxide; etc. Preferred are 2,5-dimethyl-2,5-di-(t-butylperoxy) hexyne-3 and 2,5-dimethyl-2,5-di-(t-butylperoxy) hexane, the former is available as Lupersol™ 130 and the latter as Lupersol™ 101, both trademarks and products of Elf Atochem.

Suitable azide coupling agents include azidoformates, such as tetramethylenebis(azido-formate) (see, also, U.S. Pat. No. 3,284,421, Breslow, Nov. 8, 1966); aromatic polyazides, such as 4,4'-diphenylmethane diazide (see, also, U.S. Pat. No. 3,297,674, Breslow et al., Jan. 10, 1967); and the poly(sulfonyl azides), such as p,p'-oxybis-(benzene sulfonyl azide).

The poly(sulfonyl azides) are any compounds having at least two sulfonyl azide groups ($—SO_2N_3$) reactive with the polymer(s). Preferably the poly(sulfonyl azide)s have a structure X—R—X wherein each X is $SO_2N_3$ and R represents an unsubstituted or inertly substituted hydrocarbyl, hydrocarbyl ether or silicon-containing group, preferably having sufficient carbon, oxygen or silicon, preferably carbon, atoms to separate the sulfonyl azide groups sufficiently to permit a facile reaction between the polymer(s) and the sulfonyl azide, more preferably at least 1, more preferably at least 2, most preferably at least 3 carbon, oxygen or silicon, preferably carbon, atoms between functional groups. While there is no critical limit to the length of R, each R advantageously has at least one carbon or silicon atom between X's and preferably has less than about 50, more preferably less than about 30, most preferably less than about 20 carbon, oxygen or silicon atoms. Within these limits, larger is better for reasons including thermal and shock stability. When R is straight-chain alkyl hydrocarbon, there are preferably less than 4 carbon atoms between the sulfonyl azide groups to reduce the propensity of the nitrene to bend back and react with itself. Silicon containing groups include silanes and siloxanes, preferably siloxanes. The term inertly substituted refers to substitution with atoms or groups which do not undesirably interfere with the desired reaction (s) or desired properties of the resulting coupled polymers. Such groups include fluorine, aliphatic or aromatic ether, siloxane as well as sulfonyl azide groups when more than two polyolefin chains are to be joined. Suitable structures include R as aryl, alkyl, aryl alkaryl, arylalkyl silane, siloxane or heterocyclic, groups and other groups which are inert and separate the sulfonyl azide groups as described. More preferably R includes at least one aryl group between the sulfonyl groups, most preferably at least two aryl groups (such as when R is 4,4' diphenylether or 4,4'-biphenyl). When R is one aryl group, it is preferred that the group have more than one ring, as in the case of naphthylene bis (sulfonyl azides). Poly(sulfonyl)azides include such compounds as 1,5-pentane bis(sulfonlazide), 1,8-octane bis (sulfonyl azide), 1,10-decane bis(sulfonyl azide), 1,10-octadecane bis(sulfonyl azide), 1-octyl-2,4,6-benzene tris (sulfonyl azide), 4,4'-diphenyl ether bis(sulfonyl azide), 1,6-bis(4'-sulfonazidophenyl)hexane, 2,7-naphthalene bis (sulfonyl azide), and mixed sulfonyl azides of chlorinated aliphatic hydrocarbons containing an average of from 1 to 8 chlorine atoms and from about 2 to 5 sulfonyl azide groups per molecule, and mixtures thereof. Preferred poly(sulfonyl azide)s include oxy-bis(4-sulfonylazidobenzene), 2,7-naphthalene bis(sulfonyl azido), 4,4'-bis(sulfonyl azido) biphenyl, 4,4'-diphenyl ether bis(sulfonyl azide) and bis(4-sulfonyl azidophenyl)methane, and mixtures thereof.

Sulfonyl azides are conveniently prepared by the reaction of sodium azide with the corresponding sulfonyl chloride, although oxidation of sulfonyl hydazines with various reagents (nitrous acid, dinitrogen tetroxide, nitrosonium tetrafluoroborate) has also been used.

Polyfunctional compounds capable of insertions into C—H bonds also include carbene-forming compounds such as salts of alkyl and aryl hydrazones and diazo compounds, and nitrene-forming compounds such as alkyl and aryl azides ($R—N_3$), acyl azides ($R—C(O)—N_3$), azidoformates ($R—O—C(O)—N_3$), sulfonyl azides ($R—SO_2—N_3$), phosphoryl azides (($RO)_2—(PO)—N_3$), phosphinic azides ($R_2—P(O)—N_3$) and silyl azides ($R_3—Si—N_3$).

Alternatively, silane coupling agents may be employed. In this regard, any silane that will effectively graft the polymers of this invention can be used. Suitable silanes include unsaturated silanes that comprise an ethylenically unsaturated hydrocarbyl group, such as a vinyl, allyl, isopropenyl, butenyl, cyclohexenyl or γ-(meth)acryloxy allyl group, and a hydrolyzable group, such as, for example, a hydrocarbyloxy, hydrocarbonyloxy, or hydrocarbylamino group. Examples of hydrolyzable groups include methoxy, ethoxy, formyloxy, acetoxy, proprionyloxy, and alkyl or arylamino groups. Preferred silanes are the unsaturated alkoxy silanes which can be grafted onto the polymer. These silanes and their method of preparation are more fully described in U.S. Pat. No. 5,266,627 to Meverden, et al. Vinyl trimethoxy silane (VTMOS), vinyl triethoxy silane, γ-(meth)acryloxy propyl trimethoxy silane and mixtures of these silanes are the preferred silane coupling agents for use in this invention.

The amount of silane coupling agent used in the practice of this invention can vary widely depending upon the nature of the substantially random interpolymer, the silane employed, the processing conditions, the amount of grafting initiator, the ultimate application, and similar factors.

The silane coupling agent is used to graft the polymers of this invention by any conventional method, typically in the presence of a free radical initiator for example peroxides and azo compounds, or by ionizing radiation, etc. Organic initiators are preferred, such as any one of the peroxide initiators, for example, dicumyl peroxide, di-tert-butyl peroxide, t-butyl perbenzoate, benzoyl peroxide, cumene hydroperoxide, t-butyl peroctoate, methyl ethyl ketone peroxide, 2,5-dimethyl-2,5-di(t-butyl peroxy)hexane, lauryl peroxide, and tert-butyl peracetate. A suitable azo compound is azobisisobutyl nitrite.

Those skilled in the art will be readily able to select amounts of initiator employed, with the amount selected taking into account characteristics of the polymers, such as molecular weight, molecular weight distribution, comonomer content, as well as the presence of coupling enhancing coagents, additives (such as oil) etc. Typically, the amount of initiator employed will not exceed that which is required to effect grafting.

While any conventional method can be used to silane graft the polymers, one preferred method is blending the two with the initiator in the first stage of a reactor extruder, such as a Buss kneader. The grafting conditions can vary, but the melt temperatures are typically between 160° C. and 260° C., preferably between 190° C. and 230° C., depending upon the residence time and the half-life of the initiator.

Cure is promoted with a coupling catalyst, and any catalyst that will provide this function can be used in this invention. These catalysts generally include organic bases, carboxylic acids, and organometallic compounds including organic titanates and complexes or carboxylates of lead, cobalt, iron, nickel, zinc and tin. Dibutyltindilaurate, dioctyltinmaleate, dibutyltindiacetate, dibutyltindioctoate, stannous acetate, stannous octoate, lead naphthenate, zinc caprylate, cobalt naphthenate. Tin carboxylate, especially dibutyltindilaurate and dioctyltinmaleate, are particularly effective for this invention.

Rather than employing a chemical coupling agent, coupling may be effected by use of radiation. Useful radiation types include electron beam or beta ray, gamma rays, X-rays, or neutron rays. Radiation is believed to effect coupling by generating polymer radicals which may combine and crosslink. Additional teachings concerning radiation coupling are seen in C. P. Park, "Polyolefin Foam" Chapter 9, Handbook of Polymer Foams and Technology, D. Klempner and K. C. Frisch, eds., Hanser Publishers, New York (1991), pages 198–204, which is incorporated herein by reference.

Radiation dosage depends upon the blend polymer compositions. Those skilled in the art will be readily able to select suitable radiation levels, taking into account such variables as thickness and geometry of the article to be irradiated, as well as to characteristics of the polymers, such as molecular weight, molecular weight distribution, comonomer content, the presence of coupling enhancing coagents, additives (such as oil), etc. Typically, the dosage will not exceed that which is required to effect the desired level of coupling.

The choice of coupling agent will depend on the types of polymers being grafted. The coupling agent may be added in a variety of ways. For instance, powder or liquid or pellets may be added to and/or tumble blended with one or more of the blend polymer components which have preferably (but not necessarily) been surface treated with tackifiers. Tackifiers can be obtained by the polymerization of petroleum and terpene feedstreams and from the derivatization of wood, gum, and tall oil rosin. Several classes of tackifiers include wood rosin, tall oil and tall oil derivatives, and cyclopentadiene derivatives, such as are described in United Kingdom patent application GB 2,032,439A. Other classes of tackifiers include aliphatic $C_5$ resins, polyterpene resins, hydrogenated resins, mixed aliphatic-aromatic resins, rosin esters, natural and synthetic terpenes, terpene-phenolics, and hydrogenated rosin esters. A preferred tackifier is mineral oil.

Alternatively, the coupling agent is dispersed in a suitable non-reactive liquid or tackifier (such as mineral oil) which is then tumble blended with one or more of the blend polymer components. It is especially preferred that the oil is of a room temperature viscosity such that it has sufficient flow to completely wet the surface of the pellets, and yet be sufficiently viscous such it does not drain quickly on standing prior to feeding to the extruder. A preferred oil is the white mineral oil, Drakeol™ 34 (a registered trademark and product of The Pennzoil Company). The dispersion of coupling agent in non-reactive liquid may also be injected into a melt processing equipment (such as an extruder) used to make the grafted blend compositions.

The amount of non-reactive liquid or tackifier (such as mineral oil) used will vary, and typically is in the range of 0.2–2.0 wt % (but this is not limiting). Alternatively, the coupling agent may first be compounded in a suitable thermoplastic polymer and pellets, etc of the compound may then be tumble blended with the other blend components before reactive extrusion or independently fed to the extruder.

Those skilled in the art will be readily able to select amounts of coupling agent, with the amount selected taking into account characteristics of the polymer(s) such as molecular weight, molecular weight distribution, comonomer content, the presence of coupling enhancing coagents, additives (such as oil) etc. Since it is expressly contemplated that the polymer(s) may be blended prior to coupling, those skilled in the art may use the following guidelines as a reference point in optimizing the amount of coupling agent preferred for the particular blends in question. Typically, the amount of coupling agent employed will not exceed that which is required to effect the desired level of coupling.

To graft, the coupling agent is used in an amount effective to result in the formation of 50 percent or less, preferably 40 percent or less, more preferably 30 percent or less, even more preferably 20 percent or less, most preferably 10 percent or less weight percent gel as evidenced by insolubility of the gels in boiling xylene when tested according to ASTM D-2765A-84. This amount may vary depending on the type of the coupling agent, but is generally less than about 2.0, preferably less than about 1.0, more preferably less than about 0.5, most preferably less than about 0.2 weight percent coupling agent (based on the total weight of coupling agent and polymer blend components), with these values depending on the molecular weight of the coupling agent and the molecular weight or melt index of polymers.

The coupling agent and blend are mixed at a first temperature which is at least the melting point of the lowest melting component of the blend and, after mixing, are heated to react at a second temperature which is at least greater than the first temperature and is usually greater than 100° C. and most frequently greater than 150° C. The preferred temperature range depends on the nature of the coupling agent that is used. For example, in the case of azides (including but not limited to 4,4'-disulfonylazidediphenylether) and peroxides (including but not limited to 2,5-bis(t-butylperoxy)-2,5-dimethylhexyne-3), the preferred temperature range is greater than 150° C., preferably greater than 160° C., more preferably greater than 185° C., most preferably greater than 190° C. Preferably, the upper temperature is less than 300° C.

Temperatures for use in the practice of the invention are also determined by the softening or melt temperatures of the polymer starting materials. For these reasons, the temperature is advantageously greater than about 90° C., preferably greater than about 120° C., more preferably greater than about 150° C., and most preferably greater than 170° C.

We have also surprisingly found that further improvements in melt strength of the coupled blends may be achieved by reacting at temperatures greater than or equal to 240° C., more preferably greater than or equal to 250° C. even more preferably greater than or equal to 260° C.

Preferred times at the desired decomposition temperatures are times that are sufficient to result in complete reaction of the coupling agent with the polymer(s). Preferred reaction times in terms of the half-life of the coupling agent (that is the time required for about half of the agent to be reacted at a preselected temperature, and determinable by DSC) is about 5 half-lives of the coupling agent. In the case of a bis(sulfonyl azide), for instance, the reaction time is preferably at least about 4 minutes at 200° C.

Admixing of the polymer and coupling agent is conveniently accomplished by any means within the skill in the art. Desired distribution is different in many cases, depending on what properties are to be modified. In a blend it is often desirable to have low solubility in one or more of the polymer matrices such that the coupling agent is preferentially in the other phase, or predominantly in the interfacial region between the two phases.

Treatment of blends with the coupling agent according to practice of the invention results in blends of the invention, which are referred to herein as grafted blends. A blend is advantageously mixed with a coupling agent above the softening temperature of at least one component of the blend, most preferably below the peak decomposition temperature of the coupling agent, and the resulting mixture is preferably raised to at least the peak decomposition temperature of the coupling agent.

Practice of the invention advantageously involves forming a substantially uniform admixture of polymers and coupling agent (before its decomposition). In the case of blends where there are dispersed and continuous phases, it may be sufficient for the coupling agent to be dispersed at the interface of the phases rather than being uniformly distributed.

Processes for coupling include at least one of (a) dry blending the coupling agent with the polymer, preferably to form a substantially uniform admixture and adding this mixture to melt processing equipment, e.g. a melt extruder to achieve the coupling reaction, at a temperature at least the decomposition temperature of the coupling agent; (b) introducing, e.g. by injection, a coupling agent in liquid form, e.g. dissolved in a solvent therefor or in a slurry of coupling agent in a liquid, into a device containing polymer, preferably softened, molten or melted polymer, but alternatively in particulate form, in solution or dispersion, more preferably in melt processing equipment; (c) forming a first admixture of a first amount of a first polymer and a coupling agent, advantageously at a temperature less than about the decomposition temperature of the coupling agent, preferably by melt blending, and then forming a second admixture of the first admixture with a second amount of a second polymer (for example a concentrate of a coupling agent admixed with at least one polymer and optionally other additives, is conveniently admixed into a second polymer or combination thereof optionally with other additives, to modify the second polymer(s)); (d) feeding at least one coupling agent, preferably in solid form, more preferably finely comminuted, e.g. powder, directly into softened or molten polymer, e.g. in melt processing equipment, e.g. in an extruder; or combinations thereof.

Process (c) is conveniently used to make a concentrate with a first polymer composition having a lower melting temperature, advantageously at a temperature below the decomposition temperature of the coupling agent, and the concentrate is melt blended into a second polymer composition having a higher melting temperature to complete the coupling reaction.

Concentrates are especially preferred when temperatures are sufficiently high to result in loss of coupling agent by evaporation or decomposition not leading to reaction with the polymer, or other conditions would result that effect. Alternatively, some coupling occurs during the blending of the first polymer and coupling agent, but some of the coupling agent remains unreacted until the concentrate is blended into the second polymer composition. The polymer composition optionally includes additives known within the skill in the art. When the coupling agent is added in a dry form it is preferred to mix the agent and polymer in a softened or molten state below the decomposition temperature of the coupling agent then to heat the resulting admixture to a temperature at least equal to the decomposition temperature of the coupling agent.

The polyolefin(s) and coupling agent are suitably combined in any manner which results in desired reaction thereof, preferably by mixing the coupling agent with the polymer(s) under conditions which allow sufficient mixing before reaction to avoid uneven amounts of localized reaction then subjecting the resulting admixture to heat sufficient for reaction. Preferably, a substantially uniform admixture of coupling agent and polymer is formed before exposure to conditions in which chain coupling takes place.

A substantially uniform admixture is one in which the distribution of coupling agent in the polymer is sufficiently homogeneous to be evidenced by a polymer having a melt viscosity after treatment according to the practice of the invention either higher at low angular frequency (e.g. 0.1 rad/sec) or lower at higher angular frequency (e.g. 100 rad/sec) than that of the same polymer which has not been treated with the coupling agent but has been subjected to the same shear and thermal history.

Thus, preferably, in the practice of the invention, decomposition of the coupling agent occurs after mixing sufficient to result in a substantially uniform admixture of coupling agent and polymer. This mixing is preferably attained with the polymer in a molten or melted state, which is above the crystalline melt temperature, or in a dissolved or finely dispersed condition rather than in a solid mass or particulate form. The molten or melted form is more preferred to insure homogeneity rather than localized concentrations at the surface.

While any equipment can be suitably used, equipment which provides sufficient mixing and temperature control in the same equipment, including such devices as an extruder, or a static polymer mixing devise such as a Brabender blender, are preferred. The term extruder is used in its broadest meaning to include such devices as those, which extrude pellets such as a pelletizer.

In one embodiment of the invention, the grafting process takes place in a single vessel, that is mixing of the coupling agent and polymer takes place in the same vessel as heating to the decomposition temperature of the coupling agent. The vessel is preferably an extruder, which may optionally be suitable for foam preparation. The reaction vessel more preferably has at least two zones of different temperatures into which a reaction mixture passes. The first zone advantageously is at a temperature of at least the crystalline melt temperature or the softening temperature of the polymer(s) and preferably less than the decomposition temperature of the coupling agents, with the second zone being at a temperature sufficient for decomposition of the coupling agent. The first zone is preferably at a temperature sufficiently high to soften the polymer and allow it to combine with the coupling agent, through distributive mixing to a substantially uniform admixture. Addition of a blowing agent may optionally occur in either of these zones, depending on the temperatures advantageous for its use.

In one embodiment the foam forming step or steps and the grafting steps are at least partially simultaneous. Thus the coupling agent is introduced during any step before or in a foam forming process that is of a temperature sufficiently low to result in adequate mixing before or during grafting and grafting takes place in or simultaneous with any step in a foam forming process in which the temperature is at least about the decomposition temperature of the coupling agent. Grafting, however, preferably takes place before the foam is extruded or otherwise exits the vessel in which the polymer is admixed with any blowing agent.

For polymers that have softening points above the coupling agent decomposition temperature (preferably greater than 200° C.), and especially when incorporation of a lower melting polymer (such as in a concentrate) is undesirable, the preferred method for incorporation of coupling agent is to solution blend the coupling agent in solution or admixture into the polymer, (this allows the polymer to imbibe i.e. absorb or adsorb at least some of the coupling agent), and then to evaporate the solvent. After evaporation, the resulting mixture is extruded. The solvent is preferably a solvent for the coupling agent, and more preferably also for the polymer when the polymer is soluble such as in the case of polycarbonate. Such solvents include polar solvents such as acetone, THF (tetrahydrofuran) and chlorinated hydrocarbons such as methylene chloride. Alternatively other non-polar compounds such as mineral oils in which the coupling agent is sufficiently miscible to disperse the coupling agent in a polymer, are used.

The present invention can be summarized in terms of the following embodiments:

Embodiment One

In one embodiment of the present invention, it has been found that the melt strength, hardness and/or upper service temperature of certain blend compositions comprising, (A) one or more homopolymers or interpolymers with peak crystalline melting temperature (Tm) and/or glass transition temperature (Tg by DSC) of 90° C. or more; (B) one or more homopolymers or interpolymers with peak crystalline melting temperature (Tm) and/or glass transition temperature (Tg by DSC) of 80° C. or less; can be increased significantly by grafting with (C) at least one coupling agent, preferably an azide or peroxide.

These blends of Embodiment One can comprise a grafted blend of 1) two or more substantially random interpolymers;

2) two or more olefinic polymers;

3) two or more alkenyl aromatic polymers 4) one or more substantially random interpolymers and one or more olefinic polymers;

5) one or more substantially random interpolymers, and one or more alkenyl aromatic polymers; or 6) one or more olefinic polymers, and one or more alkenyl aromatic polymers; or 7) one or more substantially random interpolymers, and one or more alkenyl aromatic polymers; or 8) one or more olefinic polymers, one or more substantially random interpolymers and one or more alkenyl aromatic polymers.

The resulting blends exhibit a more than additive increase in melt strength. This improvement is believed to result from the coupling agent reacting with more than one polymer chain to connect them, referred to herein as "grafting". Grafting results in rheology modification, i.e., change in melt viscosity of a polymer as determined by dynamic mechanical spectroscopy. The blends of Embodiment One advantageously have increased melt strength and are thus useful in making fibers, film and foams.

The blends of this invention will have upper service temperature greater than 80° C., preferably greater than 85° C. and most preferably greater than 90° C.

The blends will comprise: (A) from about 0.5 to about 99.5, preferably from about 5 to about 95, more preferably from about 10 to about 90, most preferably from about 10 to about 60 weight percent (based on the combined weights of components A and B) of one or more homopolymers or interpolymers with peak crystalline melting temperature (Tm) and/or glass transition temperature (Tg by DSC) of 90° C. or more; and (B) from about 0.5 to about 99.5, preferably from about 5 to about 95, more preferably from about 10 to about 90, most preferably from about 40 to about 90 weight percent (based on the combined weights of components A and B) of one or more homopolymers or interpolymers with peak crystalline melting temperature (Tm) and/or glass transition temperature (Tg by DSC) of 80° C. or less; and (C) one or more coupling agents.

The resulting grafted blend has (1) a gel content which is 50 percent or less, preferably 40 percent or less, more preferably 30 percent or less, even more preferably 20 percent or less, most preferably 10 percent or less as determined by insolubility of the gels in boiling xylene when tested according to ASTM D-2765A-84, (2) an increase in melt strength of 5% or more, preferably 10 percent or more relative to the same polymer blend without the coupling agent; and (3) an increase in upper service temperature (as measured by Thermal Mechanical Analyses (TMA)) of 0.5° C. or more, preferably 1.0° C. or more, more preferably 1.5° C. or more, even more preferably 5° C. or more relative to the same polymer blend without the coupling agent.

The resulting grafted blend also has a melt elongation greater than or equal to about 20 mm/s, preferably greater than or equal to about 25 mm/s, more preferably greater than or equal to about 30 mm/s.

Embodiment Two

We have also surprisingly found grafted blend compositions that exhibit a unique combination of high melt strength, high melt elongation and high flexural modulus.

The final grafted blend compositions comprise either; (A) one or more linear or substantially linear ethylene homopolymers or interpolymers and one or more branched ethylene homopolymers or interpolymers; or (B) one or more linear or substantially linear ethylene homopolymers or interpolymers and one or more substantially random interpolymers; or (C) one or more linear or substantially linear ethylene homopolymers or interpolymers, one or more branched ethylene homopolymers or interpolymers and one or more substantially random interpolymers; all of which blends are grafted with (D) one or more coupling agents.

The final grafted blend compositions exhibit high melt strength, that is values greater than about 8, preferably greater than about 10, more preferably greater than about 15 cN.

The final grafted blend compositions also have high melt elongation, that is values of 20 mm/s or greater, preferably 25 mm/s or greater.

The final grafted blend compositions also have high flexural modulus, that is values of 80,000 psi or greater, preferably 100,000 psi or greater, most preferably 110,000 psi or greater.

The final grafted blend compositions also have a gel content which is 50 percent or less, preferably 40 percent or less, more preferably 30 percent or less, even more preferably 20 percent or less, most preferably 10 percent or less as determined by insolubility of the gels in boiling xylene when tested according to ASTM D-2765A-84.

Even more preferably, the gel content of the present grafted blend composition is 10 or less, preferably 5 or less, more preferably 2 or less weight percent gel as evidenced by insolubility of the gels in boiling xylene when tested according to ASTM D-2765A-84.

Preferably these compositions comprise a grafted blend of heterogeneous or homogeneous LLDPE with LDPE, or HDPE with LDPE, or a substantially linear ethylene homopolymer or interpolymer with LDPE.

The coupling agent is preferably an azide or peroxide or combination thereof.

Embodiment Three

In another embodiment of the present invention, it has been surprisingly found that certain grafted blend compositions comprising polypropylene are able to exhibit high melt strength while retaining acceptably high flexural modulus (50,000 psi or greater).

The grafted blend compositions comprise (A) one or more olefinic polymers other than polypropylene; (B) one or more propylene homopolymers or interpolymers; and (C) at least one coupling agent, preferably an azide or peroxide.

The resulting grafted blend composition has a gel content which is 50 percent or less, preferably 40 percent or less, more preferably 30 percent or less, even more preferably 20 percent or less, most preferably 10 percent or less as determined by insolubility of the gels in boiling xylene when tested according to ASTM D-2765A-84.

The resulting grafted blend composition has a melt strength greater than about 5, preferably greater than about 10, more preferably greater than about 15 cN.

The resulting grafted blend also has a melt elongation greater than or equal to about 20 mm/s, preferably greater than or equal to about 25 mm/s.

The resulting grafted blend composition has a flexural modulus of 50,000 psi or greater.

Blends and Fabricated Articles Made from the Grafted Blends of Embodiments One to Three The present invention also includes blends and any fabricated article, which comprise any of the grafted blends of Embodiments One to Three. The blends and fabricated articles will comprise 0.05 to 100, preferably 0.1 to 100 and most preferably 0.2 to 100 weight percent of the grafted blends of Embodiments 1–3 (based on total amount of polymers present in the final blend or fabricated article).

The grafted blends of the various embodiments of the present invention may be advantageously used to produce a wide range of fabricated articles including foams, calendared, cast and blown sheets and films, compression and injection molded parts, rotational molded parts, fibers and the like. The blends are also useful in applications such as modifiers for bitumen and asphalt compositions, as components for hot melt and pressure sensitive adhesive systems, extrusion coating, blowmolding, high speed fiber spinning, oriented nonwovens, thermoforming, labels, candy wrappers, geomembranes, cereal liners, wire and cable, pipes, etc. Preferably the article is formed from a melt of the composition. More preferably it is formed by a melt process.

Blending the grafted blends of the aforementioned Embodiments 1–3 with one or more other thermoplastics provides additional improvements in properties including but not limited to upper service temperature, modulus, compressive strength, hardness, toughness, increased foam cell size, and aesthetics of the final fabricated articles (depending on if the graft or other thermoplastic is the predominant blend component).

Examples of the other thermoplastic include, but are not limited to, ethylene styrene interpolymers (ESI), ethylene vinylacetate copolymers (EVA), polypropylene (PP), polystyrene (PS), high density polyethylene (HDPE), low density polyethylene (LDPE), and linear low density polyethylene (LLDPE). In one embodiment, grafted blends of the aforementioned Embodiments 1–3, may be further blended with alkenyl aromatic polymers (such as polystyrene) to make, for example, alkenyl aromatic polymer foams with increased cell size.

The grafted blends or their blends with other thermoplastics may be prepared by any suitable means known in the art such as, for example, dry blending in a pelletized form in desired proportions followed by melt blending in an apparatus such as a screw extruder or a Banbury mixer. Dry blended pellets may be directly melt processed into a final solid state article by, for example, injection molding. The blends may also be made by direct polymerization without isolating blend components. Direct polymerization may use, for example, one or more catalysts in a single reactor or two or more reactors in series or parallel and vary at least one of operating conditions, monomer mixtures and catalyst choice.

Various additives may optionally be incorporated into the blend compositions or fabricated articles of the present invention. The additives include, without limitation, stability control agents (specifically for foams), nucleating agents (specifically for foams), inorganic fillers, conductive fillers, pigments, colorants, antioxidants, acid scavengers, ultraviolet absorbers or stabilizers, flame retardants, processing aids, extrusion aids, anti-static agents, cling additives (e.g., polyisobutylene), antiblock additives, other thermoplastic polymers, and the like. Certain of the additives, such as inorganic and conductive fillers, may also function as nucleating agents and/or open cell promoters for foams. Examples of antioxidants are hindered phenols (such as, for example, Irganox™ 1010) and phosphites (e.g., Irgafos™ 168) both trademarks of, and commercially available from, Ciba Geigy Corporation.

The additives are advantageously employed in functionally equivalent amounts known to those skilled in the art. For example, the amount of antioxidant employed is that amount which prevents the polymer or polymer blend from undergoing oxidation at the temperatures and environment employed during storage and ultimate use of the polymers. Such amount of antioxidants is usually in the range of from 0.01 to 10, preferably from 0.02 to 5, more preferably from 0.03 to 2 percent by weight based upon the weight of the polymer or polymer blend. Similarly, the amounts of any of the other enumerated additives are the functionally equivalent amounts such as the amount to render the polymer or polymer blend antiblocking, the desired amount of filler loading to produce the desired result, to provide the desired color from the colorant or pigment. Such additives are advantageously employed in the range of from 0.01 to 90, preferably from 0.02 to 70, more preferably from 0.05 to 50 percent by weight based upon the weight of the polymer or polymer blend.

In the case of foams, a nucleating agent is optionally added in order to control the size of foam cells. Preferred nucleating agents include inorganic substances such as calcium carbonate, talc, clay, titanium oxide, silica, barium stearate, barium sulfate, diatomaceous earth, mixtures of citric acid and sodium bicarbonate, and the like. When used, the amount of nucleating agent employed may range from >0 to about 5 parts by weight per hundred parts by weight of polymer (phr).

In the case of foams, a stability control agent (also known as permeability modifier) is optionally added to the present foam to enhance dimensional stability. Preferred agents include amides and esters of $C_{10-24}$ fatty acids. Such agents are seen in U.S. Pat. Nos. 3,644,230 and 4,214,054, which are incorporated herein by reference. Esters may also reduce static during and after foam manufacture. Most preferred agents include stearyl stearamide, glyceromonostearate, glycerol monobehenate, and sorbitol monostearate. When used, such stability control agents are typically employed in an amount ranging from >0 to about 10 parts per hundred parts of the polymer.

The blend compositions or fabricated articles made from the grafted blends of this invention may be substantially free of crosslinking (i.e., contain 50 percent or less, preferably 40 percent or less, more preferably 30 percent or less, even more preferably 20 percent or less, most preferably 10 percent or less weight percent gel based upon total weight of polymer, as measured according to ASTM D-2765-84, Method A).

Alternatively, the grafted blend compositions could be used to make blends or or fabricated articles which are substantially cross-linked (i.e., contain greater than 45 weight percent gel based upon the total weight of polymer, as measured according to ASTM D-2765-84 Method A) by further addition of any known cross-linking agent.

The term "cross-linking agent" as used herein means a compound or mixture of compounds used for the purposes of substantially crosslinking a polymer or polymer blend. The cross-linking agent used to prepare the compositions and articles of the present invention include, but are not limited to peroxides, silanes, radiation, azides, phenols, aldehyde-amine reaction products, substituted ureas, substituted guanidines, substituted xanthates, substituted dithiocarbamates, sulfur-containing compounds, thiazoles, imidazoles, sulfonamides, thiuramidisulfides, paraquinonedioxime, dibenzoparaquinonedioxime, sulfur; and combinations thereof.

The various crosslinking technologies are described in U.S. Pat. Nos. 5,869,591 and 5,977,271, the entire contents of both of which are herein incorporated by reference. Dual cure systems, which use a combination of heat, moisture cure, and radiation steps, may be effectively employed. Dual cure systems are disclosed and claimed in U.S. Pat. No. 6,124,370, incorporated herein by reference. For instance, it may be desirable to employ peroxide coupling agents in conjunction with silane coupling agents, peroxide coupling agents in conjunction with radiation, sulfur-containing coupling agents in conjunction with silane coupling agents, etc.

The blend compositions described above may be converted to foam products using any conventional process. Foam products include, for example, extruded thermoplastic polymer foam, extruded polymer strand foam, expandable thermoplastic foam beads, expanded thermoplastic foam beads or expanded and fused thermoplastic foam beads, and various types of crosslinked foams. The foam products may take any known physical configuration, such as sheet, round, strand geometry, rod, solid plank, laminated plank, coalesced strand plank, profiles and bun stock. The foam products may be converted into fabricated articles using any conventional process or method. For example, any one or more of expansion, coalescing and welding may be used in making such articles, especially from expandable foam beads. One may also mold expandable beads into any known configuration that employs foam products, including, but not limited to the foregoing configurations.

Foam forming steps of the process are known in the art. For instance as exemplified by the excellent teachings to processes for making ethylenic polymer foam structures and processing them in C. P. Park. "Polyolefin Foam", Chapter 9, Handbook of Polymer Foams and Technology, edited by D. Klempner and K. C. Frisch, Hanser Publishers, Munich, Vienna, New York, Barcelona (1991), which is incorporated here in by reference.

Foams of the present invention may be substantially noncrosslinked. The foam structure contains 50 or less, preferably 40 or less, more preferably 30 or less, even more preferably 20 or less, most preferably 10 or less weight percent gel based upon the total weight of foam or polymer, as measured according to ASTM D-2765-84, Method A.

The foam structure may optionally be substantially cross-linked (i.e., greater than 50 percent gel based upon the total weight of foam or polymer, as measured according to ASTM D-2765-84 Method A). The various crosslinking technologies are described in U.S. Pat. Nos. 5,869,591 and 5,977,271, the entire contents of both of which are herein incorporated by reference. Dual cure systems, which use a combination of heat, moisture cure, and radiation steps, may be effectively employed. Dual cure systems are disclosed and claimed in U.S. Pat. No. 6,124,370, incorporated herein by reference. For instance, it may be desirable to employ peroxide coupling agents in conjunction with silane coupling agents, peroxide coupling agents in conjunction with radiation, sulfur-containing coupling agents in conjunction with silane coupling agents, etc. Cross-linking may be induced by addition of a cross-linking agent. Induction of cross-linking and exposure to an elevated temperature to effect foaming or expansion may occur simultaneously or sequentially. If a chemical cross-linking agent is used, it is incorporated into the polymer material in the same manner as the chemical blowing agent. Further, if a chemical cross-linking agent is used, the foamable melt polymer material is heated or exposed to a temperature of preferably less than 150° C. to prevent decomposition of the cross-linking agent or the blowing agent and to prevent premature cross-linking. If radiation cross-linking is used, the foamable melt polymer material is heated or exposed to a temperature of preferably less than 160° C. to prevent decomposition of the blowing agent. The foamable melt polymer material is extruded or conveyed through a die of desired shape to form a foamable structure. The foamable structure is then cross-linked and expanded at an elevated or high temperature (typically, 150° C.-250° C.) such as in an oven to form a foam structure. If radiation cross-linking is used, the foamable structure is irradiated to cross-link the polymer material, which is then expanded at the elevated temperature as described above. The present structure can advantageously be made in sheet or thin plank form according to the above process using either cross-linking agents or radiation.

The foam structures of the present invention are optionally made by a conventional extrusion foaming process. The structure is advantageously prepared by heating the polymer or blend to form a plasticized or melt polymer material, incorporating therein a blowing agent to form a foamable gel, and extruding the gel through a die to form the foam product. Depending upon the die (with an appropriate number of apertures) and operating conditions, the product may vary from an extruded foam plank or rod through a coalesced foam strand product, to foam beads and eventually to chopped strands of foamable beads. Prior to mixing with the blowing agent, the polymer material is heated to a temperature at or above its glass transition temperature or melting point. The blowing agent is optionally incorporated or mixed into the melt polymer material by any means known in the art such as with an extruder, mixer, blender, or the like. The blowing agent is mixed with the melt polymer material at an elevated pressure sufficient to prevent substantial expansion of the melt polymer material and to advantageously disperse the blowing agent homogeneously therein. Optionally, a nucleator is optionally blended in the polymer melt or dry blended with the polymer material prior to plasticizing or melting. Prior to extruding foamable gel through the die, one typically cools the gel to an optimum temperature. The foamable gel is typically cooled to a lower temperature to optimize physical characteristics of the foam structure. This temperature, often referred to as the foaming temprature, is typically above each component's polymer glass transition temperature ($T_g$), or for those having sufficient crystallinity, near the peak crystalline melting temperature ($T_m$). "Near" means at, above, or below and largely depends upon where stable foam exists. The temperature desirably falls within 30° centigrade (° C.) above or below the $T_m$. For foams of the present invention, an optimum foaming temperature is in a range in which the foam does not collapse. The gel may be cooled in the extruder or other mixing device or in separate coolers. The gel is then extruded or conveyed through a die of desired shape to a zone of reduced or lower pressure to form the foam structure. The zone of lower pressure is at a pressure lower than that in which the foamable gel is maintained prior to extrusion through the die. The lower pressure is optionally superatmospheric or subatmospheric (vacuum), but is preferably at an atmospheric level.

In another embodiment, the resulting foam structure is optionally formed in a coalesced strand form by extrusion of the polymer material through a multi-orifice die. The orifices are arranged so that contact between adjacent streams of the molten extrudate occurs during the foaming process and the contacting surfaces adhere to one another with sufficient adhesion to result in a unitary foam structure. The streams of molten extrudate exiting the die take the form of strands or profiles, which desirably foam, coalesce, and adhere to one another to form a unitary structure. Desirably, the coalesced individual strands or profiles should remain adhered in a unitary structure to prevent strand delamination under stresses encountered in preparing, shaping, and using the foam. Apparatuses and method for producing foam structures in coalesced strand form are seen in U.S. Pat. Nos. 3,573,152 and 4,824,720, both of which are incorporated herein by reference.

Alternatively, the resulting foam structure is conveniently formed by an accumulating extrusion process and apparatus as seen in U.S. Pat. Nos. 4,323,528 and 5,817,705, which are incorporated by reference herein. This apparatus, commonly known as an "extruder-accumulator system" allows one to operate a process on an intermittent, rather than a continuous, basis. The apparatus includes a holding zone or accumulator where foamable gel remains under conditions that preclude foaming. The holding zone is equipped with an outlet die that opens into a zone of lower pressure, such as the atmosphere. The die has an orifice that may be open or closed, preferably by way of a gate that is external to the holding zone. Operation of the gate does not affect the foamable composition other than to allow it to flow through the die. Opening the gate and substantially concurrently applying mechanical pressure on the gel by a mechanism (e.g. a mechanical ram) forces the gel through the die into a zone of lower pressure. The mechanical pressure is sufficient to force foamable gel through the die at a rate fast enough to preclude significant foaming within the die yet slow enough to minimize and preferably eliminate generation of irregularities in foam cross-sectional area or shape. As such, other than operating intermittently, the process and its resulting products closely resemble those made in a continuous extrusion process.

In this process, low density foam structures having large lateral cross-sectional areas are prepared by: 1) forming under pressure a gel of the polymer or blend material and a blowing agent at a temperature at which the viscosity of the gel is sufficient to retain the blowing agent when the gel is allowed to expand; 2) extruding the gel into a holding zone maintained at a temperature and pressure which does not allow the gel to foam, the holding zone having an outlet die defining an orifice opening into a zone of lower pressure at which the gel foams, and an openable gate closing the die orifice; 3) periodically opening the gate; 4) substantially concurrently applying mechanical pressure by a movable ram on the gel to eject it from the holding zone through the die orifice into the zone of lower pressure, at a rate greater than that at which substantial foaming in the die orifice occurs and less than that at which substantial irregularities in cross-sectional area or shape occurs; and 5) permitting the ejected gel to expand unrestrained in at least one dimension to produce the foam structure.

The present foam structures may also be formed into foam beads suitable for molding into articles by expansion of pre-expanded beads containing a blowing agent. The beads may be molded at the time of expansion to form articles of various shapes. Processes for making expanded beads and molded expanded beam foam articles are described in Plastic Foams, Part II, Frisch And Saunders, pp. 544–585, Marcel Dekker, Inc. (1973) and Plastic Materials, Brydson, 5th Ed., pp. 426–429, Butterworths (1989). Expandable and expanded beads can be made by a batch or by an extrusion process, and may be substantially non-crosslinked or substantially crosslinked.

The batch process of making expandable beads is similar to manufacturing expandable polystyrene (EPS). The resulting foam structure is formed into non-crosslinked foam beads suitable for molding into articles. Discrete resin particles, such as granules made from the blends of the present invention, made either by melt blending or in-reactor blending, are impregnated with a blowing agent (and optionally a cross-linking agent) in an aqueous suspension or in an anhydrous state in a pressure vessel at an elevated temperature and pressure. In the case of the aqueous supsension, the blowing agent (and, optionally, cross-linking agent) is/are introduced into the liquid medium in which the granules are substantially insoluble (such as water) at an elevated pressure and temperature in an autoclave or other pressure vessel. The granules are either discharged rapidly into an atmosphere or a region of reduced pressure to expand the granules into foam beads or cooled and discharged as unexpanded beads. In a separate step, the unexpanded beads are heated to expand them, e.g., with steam or with hot air. This process for making bead foams is well taught in U.S. Pat. Nos. 4,379,859 and 4,464,484, which are incorporated herein by reference.

In a modification of the bead process, styrene monomer is optionally impregnated into the suspended pellets of the blend compositions of the present invention prior to their impregnation with blowing agent to form a graft interpolymer with the polymer material. The resulting interpolymer beads are cooled and discharged from the vessel substantially unexpanded. The beads are then expanded and molded by an expanded polystyrene bead molding process within the skill in the art. Such a process of making such polyethylene/polystyrene interpolymer beads is known in the art. Some of the methods are taught in U.S. Pat. Nos. 3,504,068 and 3,953,558, both incorporated herein by reference. Excellent teachings of the above processes and molding methods are seen in C. P. Park, supra, p. 191, pp. 197–198, and pp. 227–233, U.S. Pat. Nos. 3,886,100, 3,959,189, 4,168,353 and 4,429,059 which are incorporated herein by reference.

The present crosslinked foam structure may also be made into a continuous plank structure by an extrusion process utilizing a long-land die as described in GB 2,145,961A. In that process, the polymer, chemical blowing agent and cross-linking agent are mixed in an extruder, heating the mixture to let the polymer cross-link and the blowing agent to decompose in a long-land die; and shaping and conducting away from the foam structure through the die with the foam structure and the die contact lubricated by a proper lubrication material.

The present crosslinked foam structure may be made in bun stock form by two different processes. One process involves the use of a cross-linking agent and the other uses radiation.

The present crosslinked foam structure may be made in bun stock form by mixing the blends of this invention, a cross-linking agent, and a chemical blowing agent to form a slab, heating the mixture in a mold so the cross-linking agent can cross-link the polymer material and the blowing agent can decompose, and expanding by release of pressure in the mold. Optionally, the bun stock formed upon release of pressure may be re-heated to effect further expansion.

Foam may be made from cross-linked polymer sheet by either irradiating polymer sheet with high energy beam or by heating a polymer sheet containing chemical cross-linking agent. The cross-linked polymer sheet is cut into the desired shapes and impregnated with nitrogen in a higher pressure at a temperature above the softening point of the polymer; releasing the pressure effects nucleation of bubbles and some expansion in the sheet. The sheet is re-heated at a lower pressure above the softening point, and the pressure is then released to allow foam expansion.

Blowing agents useful in making the foam structures of the present invention include inorganic agents, organic blowing agents and chemical blowing agents. Suitable inorganic blowing agents include carbon dioxide, nitrogen, argon, water, air, sulfur hexafluoride ($SF_6$) and helium. Organic blowing agents include aliphatic hydrocarbons having 1–9 carbon atoms, aliphatic alcohols having 1–3 carbon atoms, and fully and partially halogenated aliphatic hydrocarbons having 1–4 carbon atoms. Aliphatic hydrocarbons include methane, ethane, propane, n-butane, isobutane, n-pentane, isopentane, neopentane, and the like. Aliphatic alcohols include methanol, ethanol, n-propanol, and isopropanol. Fully and partially halogenated aliphatic hydrocarbons include fluorocarbons, chlorocarbons, and chlorofluorocarbons. Examples of fluorocarbons include methyl fluoride, perfluoromethane, ethyl fluoride, 1,1-difluoroethane (HFC-152a), fluoroethane (HFC-161), 1,1,1-trifluoroethane (HFC-143a), 1,1,1,2-tetrafluoroethane (HFC-134a), 1,1,2,2-tetrafluoroethane (HFC-134), 1,1,1,3,3-pentafluoropropane, pentafluoroethane (HFC-125), difluoromethane (HFC-32), perfluoroethane, 2,2-difluoropropane, 1,1,1-trifluoropropane, perfluoropropane, dichloropropane, difluoropropane, perfluorobutane, perfluorocyclobutane. Partially halogenated chlorocarbons and chlorofluorocarbons for use in this invention include methyl chloride, methylene chloride, ethyl chloride, 1,1,1-trichloroethane, 1,1-dichloro-1 fluoroethane (HCFC-141b), 1-chloro-1,1-difluoroethane (HCFC-142b), chlorodifluoromethane (HCFC-22), 1,1-dichloro-2,2,2-trifluoroethane (HCFC-123) and 1-chloro-1,2,2,2-tetrafluoroethane (HCFC-124). Fully halogenated chlorofluorocarbons include trichloromonofluoromethane (CFC-11), dichlorodifluoromethane (CFC-12), trichlorotrifluoroethane (CFC-113), dichlorotetrafluoroethane (CFC-114), chloroheptafluoropropane, and dichlorohexafluoropropane. Chemical blowing agents include azodicarbonamide, azodiisobutyro-nitrile, barium azodicarboxylate, N,N'-dimethyl-N,N'-dinitrosoterephthalamide, and benzenesulfonhydrazide, 4,4-oxybenzene sulfonyl semicarbazide, and p-toluene sulfonyl semicarbazide, trihydrazino triazine and mixtures of citric acid and sodium bicarbonate such as the various products sold under the name Hydrocerol™ (a product of Boehringer Ingelheim). Any of the foregoing blowing agents may be used singly or in combination with one or more other blowing agents. Preferred blowing agents include isobutane, carbon dioxide, HFC-152a, and mixtures of the foregoing.

The amount of blowing agent incorporated into the polymer melt material to make a foam-forming polymer gel is from about 0.05 to about 5.0, preferably from about 0.2 to about 3.0, and most preferably from about 0.5 to 2.5 gram moles per kilogram of polymer.

Foams are optionally perforated to enhance or accelerate gaseous permeation exchange wherein blowing agent exits from the foam and air enters into the foam. The resulting perforated foams have defined therein a multiplicity of channels that are preferably free of direction with respect to the longitudinal extension of the foam. The channels extend from one foam surface at least partially through the foam, and sometimes completely through the foam from one external surface to another external surface. The channels are advantageously present over substantially an entire exterior foam surface, preferably with uniform or substantially uniform spacing. Suitable spacing intervals may be up to and including 2.5 centimeters (cm), preferably up to and including 1.3 cm. The foams optionally employ a stability control agent of the type described above in combination with perforation to allow accelerated permeation or release of blowing agent while maintaining a dimensionally stable foam. U.S. Pat. Nos. 5,424,016, 5,585,058, WO 92/19439 and WO 97/22455, the teachings of which are incorporated herein by reference, provide excellent information relative to perforation. If desired, the foams of this invention may be post-treated by any known means to increase foam open cell content. Such post-treatment methods include, without limit, mechanically compressing the foam and expanding the foam by exposure to steam or hot air.

Foams of the present invention generally have a density less than 900, preferably less than 850, more preferably less than 800 kg/m³, and even more preferably from about 5 to about 700 kilograms per cubic meter (in accordance with ASTM D3575-93, Suffix W, Method B). The foams generally have an average cell size of from about 0.001 to about 10.0, preferably from about 0.002 to about 5.0, and more preferably 0.003 to about 3.0 millimeters as measured according to the procedures of ASTM D3576. The preferred ranges of density and cell size should not be taken as limiting the scope of this invention.

Foams of the present invention preferably exhibit excellent dimensional stability. Preferred foams retain 80 or more percent of their initial volume when measured one month after an initial volume measurement within 30 seconds after foam expansion. Volume is measured by any suitable method such as cubic displacement of water.

The foams of the present invention have an open cell content that ranges from 0 to 100 volume percent based on the total volume of foam, as measured according to ASTM D2856-94, depending upon component selection and process condition variations. Foams with an open cell content of 30 vol% or less generally fall in a class known as closed cell foams. Those known as open cell foams typically have an open cell content greater than 30, preferably greater than 40, and more preferably greater than 50 vol%. The open cell content is desirably 100 vol% or less, preferably 95 vol% or less, and more preferably 90 vol% or less.

The foams generally have an Asker-C hardness of ≦80, desirably ≦75, and preferably ≧70. Hardness measurements of the foams use an Asker C durometer for cellular rubber and yarn in accordance with ASTM D2240-97, using a 5 mm diameter spherical indentor.

If the foam is in the shape of a sheet or plank, it has a thickness that is generally ≧0.5 mm, preferably ≧1 mm and a width that is generally ≧5 mm, preferably ≧10 mm. As used herein "thickness" of a foam plank or sheet refers to its smallest cross-sectional dimension (e.g. as measured from one planar surface to an opposing planar surface). When the foam is present as a round or rod, it has a diameter that is generally ≧5 mm, preferably ≧10 mm.

The foam has a drop-test optimum C-factor (ASTM-D1596) of ≦6, desirably ≦5, and preferably ≦4.

The foams of the present invention may be used in any application where foams of comparable density and open or closed cell contents are used today. Such applications include, without limit, cushion packaging (e.g. corner blocks, braces, saddles, pouches, bags, envelopes, overwraps, interleafing, encapsulation) of finished electronic goods such as computers, televisions, and kitchen appliances; packaging or protection of explosive materials or devices; material handling (trays, tote boxes, box liners, tote box inserts and dividers, shunt, stuffing, boards, parts spacers and parts separators); work station accessories (aprons, table and bench top covers, floor mats, seat cushions); automotive (headliners, impact absorption in bumpers or doors, carpet underlayment, sound insulation); flotation (e.g. life jackets, vests and belts); sports and leisure (e.g. gym mats and bodyboards); thermal insulation such as that used in building and construction); acoustical insulation (e.g. for appliances and building and construction); gaskets, grommets, seals; sound attenuation for printers and typewriters; display case insert; missile container padding; military shell holder; blocking and bracing of various items in transport; preservation and packaging; automotives anti-rattle pads, seals; medical devices, skin contact pads; cushioned pallet; and vibration isolation pad. The foregoing list merely illustrates a number of suitable applications. Skilled artisans can readily envision additional applications without departing from the scope or spirit of the present invention.

The film of the present invention may be a monolayer or a multilayer film. One or more layers of the film may be oriented or foamed. A multi-layer film of the present invention may contain one, two or more layers comprising a blend as defined herein. Preferably, the film according to the invention has a thickness of about 0.5 to about 10 mils. Preferably, the present invention pertains to a tough and stiff film, comprising the grafted blends of this invention. The film of the invention may be printed. The film of the invention is obtainable according to methods known in the art. The film may be made using a blown or a cast film extrusion process, including co-extrusion and extrusion coating. One or more layers of the film may be expanded, for example with a conventional blowing agent, to make foamed film. One or more films may be laminated to form a multi-layer structure. The films may be (further) oriented after forming via tenter frame, double-bubble or other blown film techniques.

In one embodiment, the film of the present invention is an oriented film. The term "orientation" as used herein refers to a process of stretching a hot polymeric article to align the molecular chains in the direction(s) of stretching. When the stretching is applied in one direction, the process is called uniaxial orientation; when the stretching is applied in two (perpendicular) directions, the process is called biaxial orientation. Orientation can be uniaxial or, preferably, biaxial. Orientation may be accomplished according to conventional methods, such as blown film processes, "double-bubble" film processes, cast/tentered film processes or other techniques known in the art to provide orientation. The oriented films of the invention are particularly suitable for use in window envelope and related applications.

In another aspect, the present invention relates to a foamed film. Such film is especially suitable for use as label or in thermoformable articles of manufacture. To make foamed film structures, either physical or chemical blowing agents may be used. A multilayer film of the invention comprising one or more foamed layers comprising the grafted blends as defined herein is obtainable according to methods known in the art, for example, using a co-extrusion process. Preferred are two-layer or three-layer films with one or two surface layers and the foamed layer being the core layer. The surface layers may or may not comprise the grafted blends of this invention. In a three layer structure, preferably, the foamed layer is the core or middle layer. The label film may be constructed from printed, slit to width, rolls of film with the labels glued to a container, for example a bottle, using conventional adhesives and glues known to the industry. In addition, the films of this invention may be printed, coated with pressure sensitive adhesives, laminated to release papers or films and applied to bottles, containers or other surfaces by conventional pressure sensitive techniques. The bottle may be a glass bottle or a PET bottle. Covering or affixed to a glass bottle, the label may also serve a protective purpose. If the bottle is a PET bottle, the preferred label is a wrap-around label.

The following examples illustrate, but do not in any way limit the scope of the present invention.

Test Methods

Melt Index was determined by ASTM D-1238 (190° C./2160 g).

Resin (polymer) density was determined by ASTM D-792, employing Archimede's buoyancy displacement principal.

Flexural Modulus, 1 percent Secant Modulus and 2 percent Secant Modulus were measured in accordance with ASTM D-790-91, Method 1, Procedure B. The 1% Secant Modulus, 2% Secant Modulus and the Flex Modulus were determined using a bar of rectangular cross-section tested using a three-point loading system and a 10 pound load cell.

Melt Tension—The melt tension (in grams) was measured at 160° C. and 190° C. using a 2.16 kg load and pulling the strands of molten polymers at 50 rpm around a pulley system for a haul-off rate over a thirty second period. The melt tension was this average force.

Melt Strength—The measurements were conducted by pulling strands of molten polymers at constant acceleration until draw resonance or breakage occurred. The experimental set-up consisted of a capillary rheometer and a Rheotens apparatus as take-up device. The force required to uniaxially extend the strands was recorded as a function of the take-up velocity. The maximum force attained before significant draw resonance or breakage occurred was defined as the melt strength. The velocity at which draw resonance or breakage occurred was defined as the melt elongation. The tests were run under the following conditions:

| | |
|---|---|
| Mass flow rate: | 1.35 gram/minute |
| Temperature: | 190° C. (unless other indicated), |
| Capillary length: | 41.9 mm |
| Capillary diameter: | 2.1 mm |
| Piston diameter: | 9.54 mm |
| Piston velocity: | 0.423 mm/s |
| Shear rate : | 33.0 s$^{-1}$ |
| Draw-down distance (die exit to take-up wheels): | 100 mm |
| Cooling conditions : | ambient air |
| Acceleration: | 2.4 mm/s$^2$ |

Upper Service Temperature—A thermomechanical analyzer (TMA) commercially available from Perkin Elmer Corporation under the trade designation model TMA 7 was used to measure the upper service temperature (UST). Probe force of 102 g and heating rate of 5° C./min were used. Each test specimen was a disk with thickness of 3.3 mm and 7.8 mm diameter, prepared by compression molding at 205° C. and air-cooling to room temperature. Temperature at the probe penetration of 1 mm was taken as the upper service temperature (UST).

The glass transition temperatures (Tg) and peak melting temperature (Tm) were determined by differential scanning calorimetry (DSC). Sample size was approximately 5 mg. The following procedure was used for the DSC measurements: the sample was placed in a sealed aluminum pan and heated rapidly from ambient temperature to 180° C. (at a rate of 105° C. per minute); kept at 180° C. for three minutes to ensure complete melting; cooled at 10° C./min to about −60° C. or 40° C. below the expected Tg; kept at this temperature for three minutes for DSC stabilization; and heated to 150° C. (in general, for ethylenic and alkenyl aromatic polymers) and 190° C. (for polypropylenes) at a rate of 10° C./min. The peak crystallization temperature (Tc) was obtained from the cooling curve. The peak melting temperature (Tm) was obtained from the melting curve (second heat) and was the peak melting temperature. The glass transition temperature (Tg) was obtained using the half-height method from the second heat DSC curve.

Gel Content was determined by xylene extraction—ASTM D-2765 Procedure "A" to measure the degree of crosslinking of polyethylene. Samples were immersed in xylene to extract what was not a gel (or crosslinked). After extraction, the sample was then dried and weighed. The resulting data was converted to percent gel.

EXAMPLES

The following blend components were used in the Examples

LDPE 620I is a low density polyethylene available from The Dow Chemical Company

PROFAX PF814 and PROFAX SR256M are polypropylenes available from and trademarks of Montell.

H704-04 and H700-12 are polypropylene homopolymers available from The Dow Chemical Company ESI 1 is a substantially random ethylene styrene interpolymer (ESI) having a styrene content of 39 mol % and a melt index, I2, of 1.0 g/10 min.

ESI 2 is a substantially random ethylene styrene interpolymer (ESI) having a styrene content of 10 mol % and a melt index, I2, of 1.0 g/10 min.

ESI 3 is a substantially random ethylene styrene interpolymer (ESI) having a styrene content of 29 mol % and a melt index, I2, of 0.5 g/10 min.

ESI 4 is a substantially random ethylene styrene interpolymer (ESI) having a styrene content of 39 mol % and a melt index, I2, of 1.0 g/10 min.

EG8200 refers to AFFINITY™ EG8200 available from and a trademark of The Dow Chemical Company.

DOWLEX™ 2045A is a linear low density polyethylene available from and a trademark of The Dow Chemical Company.

STYRON™ 663 is a general purpose polystyrene available from and a trademark of The Dow Chemical Company.

XU70262.08 refers to general purpose polystyrene of 11 g/10 min melt flow rate and is available from The Dow Chemical Company HDPE 10462N, 05862N and DSV10305.00 are high density polyethylenes available from The Dow Chemical Company HFE-034 is a high density polyethylene available from Mobil Chemical Company LDPE 662I is a low density polyethylene available from The Dow Chemical Company LDPE XSS84812.06 is a low density polyethylene of 0.923 g/cm$^3$ density and 0.9 dg/min melt index (I2) available from The Dow Chemical Company LDPE XUS61528.29 is a linear low density polyethylene of 0.919 g/cm$^3$ density and 0.5 dg/min melt index (I2) available from The Dow Chemical Company.

ESI's 1–4 were prepared using the coatalysts, cocatalysts and polymerizations procedures as described in U.S. Pat. No. 6,133,333, columns 14–23 and U.S. Pat. No. 6,136,923, columns 14–19, the contents of both of which are herein incorporated by reference:

Embodiment 1

Examples 1–24

Different polymers were dry blended with various loadings of 4,4'-oxybis(benzene sulfonyl azide) using 4000 ppm mineral oil as a tackifying agent. The blends were compounded on a Leistreitz 18 mm twin screw extruder with LD=30 at 200 rpm. Temperature settings were: Zone 1—130° C.; zone 2—170° C.; zone 3—190° C.; zone 4—190° C.; zone 5—190° C.; die —190° C. Final melt temperatures ranged from 205° C. to 212° C. The same polymer blends were compounded without the azide (but with 4000 ppm mineral oil) under the same conditions for comparison.

The data are presented in Table 1. In general, the grafted blends exhibited improvements (increases) over the same blends without grafting in at least one of the following: hardness, melt strength and/upper service temperature. These data indicate that branching has been introduced by grafting of the various polymers.

TABLE 1

| Ex # | Wt %/Wt % Component A & B | Azide (phr) | % Gels | Hardness Shore A | Melt Strength (cN) | Melt Elongation (mm/s) | Temp (° C.) | TMA 0.1 mm | TMA 0.2 mm | TMA 1 mm |
|---|---|---|---|---|---|---|---|---|---|---|
| Comp. Ex. 1 | 50/50 LDPE 620I & ESI 1 | 0 | 0.09 | 88.5 | 27 | 88 | 140 | 95.5 | 101.3 | 109.6 |
| Ex. 1 | 50/50 LDPE 620I & ESI 1 | 0.1 | 0.108 | 87 | 31 | 67 | 140 | 104 | 107 | 111.5 |
| Ex. 2 | 50/50 LDPE 620I & ESI 1 | 0.2 | 26.07 | 89 | 44 | 38 | 140 | 105.5 | 107.8 | 112.3 |
| Comp Ex 2 | 30/70 LDPE 620I & ESI 1 | 0 | 0.15 | 78.5 | 23 | 158 | 150 | 53 | 60.5 | 80 |
| Ex. 3 | 30/70 LDPE 620I & ESI 1 | 0.05 | 0.98 | 79 | 19 | 124 | 190 | 59.4 | 67.2 | 89.4 |
| Ex. 4 | 30/70 LDPE 620I & ESI 1 | 0.1 | 1.29 | 78.5 | 32 | 54 | 150 | 87 | 95.5 | 109 |
| Ex. 5 | 30/70 LDPE 620I & ESI 1 | 0.2 | 30.07 | 81.5 | 50 | 36 | 150 | 86.5 | 92 | 104.3 |
| Ex. 6 | 30/70 LDPE 620I & ESI 2 | 0.1 | 0.62 | 84.5 | N/A | N/A | N/A | 63.1 | 68 | 78.3 |
| Comp Ex 3 | 50/50 LDPE 620I & EG8200 | 0 | 1.24 | 81.5 | 13 | 180 | 140 | 86.5 | 92 | 104.2 |
| Ex. 7 | 50/50 LDPE 620I & EG8200 | 0.1 | 1.13 | 82.5 | 30 | 55 | 140 | 95.5 | 99.1 | 107 |
| Ex. 8 | 50/50 LDPE 620I & EG8200 | 0.2 | 5.9 | 82.5 | 45 | 32 | 140 | 96.6 | 101.4 | 107.5 |
| Comp Ex 4 | 30/70 LDPE 620I & EG8200 | 0 | 1.28 | 75.5 | 6 | 160 | 140 | 60 | 64.1 | 75.1 |
| Ex. 9 | 30/70 LDPE 620I & EG8200 | 0.05 | 1.09 | 77 | 5 | 390 | 190 | 65.4 | 68.7 | 80.2 |
| Ex. 10 | 30/70 LDPE 620I & EG8200 | 0.1 | 1.50 | 77 | 21 | 60 | 140 | 70 | 76 | 95 |
| Ex. 11 | 30/70 LDPE 620I & EG8200 | 0.2 | 2.31 | 78.5 | 33 | 52 | 140 | 67.5 | 73.4 | 93 |
| Comp Ex 5 | 50/50 PROFAX PF814 & ESI 1 | 0 | 0.86 | 95 | 22 | 125 | 180 | 144 | 146 | 151 |
| Ex 12 | 50/50 PROFAX PF814 & ESI 1 | 0.1 | 1.08 | 96.5 | 40 | 23 | 180 | 145 | 147 | 153 |
| Ex 13 | 50/50 PROFAX PF814 & ESI 1 | 0.2 | 29.50 | 96 | 39 | 28 | 180 | 148 | 150 | 154.8 |
| Comp Ex 6 | 50/50 PROFAX SR256M & ESI 1 | 0 | 1.25 | 90 | 4 | 130 | 180 | 132.5 | 135 | 142 |
| Ex 14 | 50/50 PROFAX SR256M & ESI 1 | 0.1 | 0.08 | 90.5 | 62 | 26 | 180 | 132 | 134.2 | 141.8 |
| Ex 15 | 50/50 PROFAX SR256M & ESI 1 | 0.2 | 41.86 | 90.5 | 60 | 23 | 180 | 132 | 135 | 144 |
| Comp Ex 7 | 30/70 PROFAX PF814 & ESI 1 | 0 | 0.60 | 88.5 | 19 | 137 | 190 | 66 | 75 | 100.5 |
| Ex. 16 | 30/70 PROFAX PF814 & ESI 1 | 0.05 | 1.13 | 89 | 30 | 54 | 190 | 102.4 | 111 | 132.9 |
| Ex 17 | 30/70 PROFAX PF814 & ESI 1 | 0.1 | 0.46 | 89.5 | 37 | 27 | 190 | 112 | 126 | 145.5 |
| Ex 18 | 30/70 PROFAX PF814 & ESI 1 | 0.2 | 19.71 | 89.5 | 34 | 26 | 190 | 135 | 140 | 150 |
| Ex. 19 | 30/70 H704-04 & ESI 1 | 0.025 | 1.07 | 90 | 12 | 90 | 190 | 68.7 | 76.1 | 95.6 |
| Ex. 20 | 30/70 H704-04 & ESI 1 | 0.05 | 0.62 | 90.5 | 24 | 50 | 190 | 77.6 | 88.8 | 121.6 |
| Ex. 21 | 30/70 H704-04 & ESI 2 | 0.05 | 0.51 | 91 | 39 | 33 | 190 | 67.7 | 71.6 | 86.5 |
| Ex. 22 | 30/70 H704-04 & ESI 2 | 0.1 | 0.75 | 93.5 | N/A | N/A | N/A | 74.1 | 78.8 | 119.2 |
| Ex. 23 | 30/70 H704-04 & ESI 2 | 0.15 | 1.14 | 93 | N/A | N/A | N/A | 78.7 | 87.9 | 133.5 |
| Ex. 24 | 70/30 H704-04 & ESI 2 | 0.1 | 1.64 | 85.5 | N/A | N/A | N/A | 154.3 | 155.7 | 160.3 |

Examples 25–33

Different polymers were dry blended with various loadings of 4,4'-oxybis(benzene sulfonyl azide) using 4000 ppm mineral oil as a tackifying agent. The blends were compounded on a Leistreitz 18 mm twin screw extruder with L/D=30 at 200 rpm. Temperature settings were: Zone 1—130° C.; zone 2—170° C.; zone 3—190° C.; zone 4—190° C.; zone 5—190° C.; die—190° C. Final melt temperatures ranged from 183° to 212° C. The same polymer blends were compounded without the azide (but with 4000 ppm mineral oil) under the same conditions for comparison. In general, the extruder exit pressure, extruder torque, hardness, melt strength and upper service temperature increased with increasing amounts of the azide. These data in Table 2 indicate that branching had been introduced by coupling or grafting of the various polymers.

TABLE 2

| Ex # | Blend Composition | 0 ppm azide* | 250 ppm azide | 500 ppm azide | 1000 ppm azide | 2000 ppm azide |
|---|---|---|---|---|---|---|
| Ex 25 | 30/70 STYRON* 663/ESI 3 | | | | | |
| | Melt Temperature (° C.) | 210 | 222 | 223 | 211 | 211 |
| | Extruder exit pressure (psi) | 700 | 850 | 930 | 900 | 1500 |
| | Torque (m-g) | 5500 | 5800 | 6000 | 6000 | 6500 |
| | % Gels | 0.46 | 1.69 | 1.85 | 1.00 | 22.14 |
| | Shore A hardness | 78 | | | 82 | 89 |
| | Melt strength (cN) at 170° C. | N/A | | | 89 | 109 |
| | Melt elongation (mm/s) at 170° C. | N/A | | | 46 | 31 |
| | Temp. to penetrate 0.1 mm in TMA (° C.) | 42 | 58.5 | 78.7 | 73 | 94 |
| | Temp. to penetrate 0.2 mm in TMA (° C.) | 49 | 67.5 | 87.7 | 84 | 99.5 |
| | Temp. to penetrate 1 mm in TMA (° C.) | 68 | 95.4 | 105.8 | 106 | 109 |
| Ex. 26 | 30/70 STYRON* 663/ ESI 1 | | | | | |
| | Melt Temperature (° C.) | 210 | 227 | 224 | 211 | 210 |
| | Extruder exit pressure (psi) | 650 | 560 | 675 | 950 | 1200 |
| | Torque (m-g) | 5900 | 4600 | 4800 | 6000 | 6100 |
| | % Gels | 0.41 | 1.99 | 0.94 | 4.64 | 34.34 |
| | Shore A hardness | 90 | | | 90.5 | 93 |
| | Melt strength (cN) at 170° C. | 37 | | | 95 | 99 |
| | Melt elongation (mm/s) at 170° C. | 580 | | | 95 | 32 |
| | Temp. to penetrate 0.1 mm in TMA (° C.) | 96 | 74 | 15.2 | 96 | 99.5 |
| | Temp. to penetrate 0.2 mm in TMA (° C.) | 100 | 80.8 | 83.5 | 100 | 102.2 |
| | Temp. to penetrate 1 mm in TMA (° C.) | 107 | 97.6 | 102 | 107 | 109 |
| Ex 27 | 30/70 STYRON* 663/EG8200 | | | | | |
| | Melt Temperature (° C.) | | 217 | 213 | | |
| | Extruder exit pressure (psi) | | 400 | 500 | | |
| | Torque (m-g) | | 2000 | 2400 | | |
| | % Gels | | 0.56 | 0.88 | | |
| | Shore A hardness | | | | | |
| | Temp. to penetrate 0.1 mm in TMA (° C.) | | 60.4 | 61.7 | | |
| | Temp. to penetrate 0.2 mm in TMA (° C.) | | 67.7 | 67.5 | | |
| | Temp. to penetrate 1 mm in TMA (° C.) | | 75.4 | 75.3 | | |
| Ex 28 | 30/70 XU70262.08/ ESI 3 | | | | | |
| | Melt Temperature (° C.) | | 227 | 227 | | |
| | Extruder exit pressure (psi) | | 675 | 700 | | |
| | Torque (m-g) | | 5200 | 5000 | | |
| | % Gels | | 0.26 | 0.87 | | |
| | Shore A hardness | | | | | |
| | Temp. to penetrate 0.1 mm in TMA (° C.) | | 56 | 80.7 | | |
| | Temp. to penetrate 0.2 mm in TMA (° C.) | | 63.4 | 89 | | |
| | Temp. to penetrate 1 mm in TMA (° C.) | | 84 | 103.8 | | |
| Ex. 29 | 50/50 STYRON* 663/ ESI 1 | | | | | |
| | Melt Temperature (° C.) | 208 | | | 210 | 210 |
| | Extruder exit pressure (psi) | 650 | | | 600 | 1200 |
| | Torque (m-g) | 5800 | | | 5600 | 6200 |
| | % Gels | 0.48 | | | 0.11 | 36.75 |
| | Shore A hardness | 94.5 | | | 94.5 | 94 |
| | Melt strength (cN) at 170° C. | 60 | | | 128 | 98 |
| | Melt elongation (mm/s) at 170° C. | 525 | | | 48 | 23 |
| | Temp. to penetrate 0.1 mm in TMA (° C.) | 104.6 | | | 105.6 | 105.6 |
| | Temp. to penetrate 1 mm in TMA (° C.) | 111 | | | 112 | 113 |
| Ex. 30 | 50/50 STYRON* 663/ ESI 3 | | | | | |
| | Melt Temperature (° C.) | 210 | | | 209 | 211 |
| | Extruder exit pressure (psi) | 710 | | | 850 | 1400 |
| | Torque (m-g) | 5800 | | | 5500 | 6400 |
| | % Gels | 0.12 | | | 0.60 | 38.19 |
| | Shore A hardness | 94 | | | 93.5 | 95.5 |
| | Melt strength (cN) at 190° C. | 26 | | | 50 | 68 |
| | Melt elongation (min/s) at 190° C. | 700 | | | 80 | 24 |
| | Temp. to penetrate 0.1 mm in TMA (° C.) | 106 | | | 105 | 105.8 |
| | Temp. to penetrate 1 mm in TMA (° C.) | 112 | | | 113 | 113 |
| Ex. 31 | 50/50 STYRON* XU70262.08/ESI 3 | | | | | |
| | Melt Temperature (° C.) | 210 | | | 212 | 195 |
| | Extruder exit pressure (psi) | 1000 | | | 750 | 1200 |
| | Torque (m-g) | 6500 | | | 5800 | 6800 |
| | % Gels | 2.71 | | | 0.06 | 30.18 |
| | Shore A hardness | 94.5 | | | 95 | 96.5 |
| | Melt strength (cN) at 190° C. | 12 | | | 38 | 90 |
| | Melt elongation (mm/s) at 190° C. | 440 | | | 77 | 33 |
| | Temp. to penetrate 0.1 mm in TMA (° C.) | 103 | | | 104 | 104 |
| | Temp. to penetrate 1 mm in TMA (° C.) | 110 | | | 111 | 112 |

TABLE 2-continued

| Ex # | Blend Composition | 0 ppm azide* | 250 ppm azide | 500 ppm azide | 1000 ppm azide | 2000 ppm azide |
|---|---|---|---|---|---|---|
| Ex 32 | 50/50 STYRON* XU70262.08/ ESI 1 | | | | | |
| | Melt Temperature (° C.) | 205 | | | 183 | 206 |
| | Extruder exit pressure (psi) | 500 | | | 750 | 1150 |
| | Torque (m-g) | 5800 | | | 5900 | 6300 |
| | % Gels | 0.95 | | | 1.36 | 42.99 |
| | Shore A hardness | 94 | | | 94.5 | 96.5 |
| | Melt strength (cN) at 190° C. | 11 | | | 35 | N/A |
| | Melt elongation (mm/s) at 190° C. | 180 | | | 190 | N/A |
| | Temp. to penetrate 0.1 mm in TMA (° C.) | 103 | | | 103 | 102 |
| | Temp. to penetrate 1 mm in TMA (° C.) | 109 | | | 110 | 111 |
| Ex 33 | 50/50 STYRON* 663/EG8200 | | | | | |
| | Melt Temperature (° C.) | 210 | | | 209 | 209 |
| | Extruder exit pressure (psi) | 500 | | | 700 | 750 |
| | Torque (m-g) | 5000 | | | 5200 | 5500 |
| | % Gels | 1.00 | | | 12.52 | 40.98 |
| | Shore A hardness | 94.5 | | | 95 | 95.5 |
| | Melt strength (cN) at 140° C. | N/A | | | 65 | 25 |
| | Melt elongation (mm/s) at 140° C. | N/A | | | 33 | 48 |
| | Temp. to penetrate 0.1 mm in TMA (° C.) | 99 | | | 104.6 | 104 |

* Not an Example of Claimed Invention.

Examples 34–36

Mixtures of linear low density polyethylene (LLDPE) and polystyrene (PS), or mixtures of low density polyethylene (LDPE) and PS, were dry blended with 4,4'-oxybis(benzene sulfonyl azide) using 4000 ppm mineral oil as a tackifying agent. The blends were compounded on a Leistreitz 18 mm twin screw extruder with L/D=30 at 125 rpm. Temperature settings were: Zone 1—150° C.; zone 2—175° C.; zone 3—200° C.; zone 4— 225° C.; zone 5—225° C.; die—225° C. The comparative example was a film grade LLDPE that was run with 4000 ppm mineral oil at the same process settings. The data are presented in Table 3. In general, the grafted blends exhibited comparatively higher melt strength, improved melt elongation and very low gel content.

TABLE 3

| | Comp. Ex 8 | Ex 34 | Ex 35 | Ex 36 |
|---|---|---|---|---|
| LLDPE XUS61528.29 (weight %) | 100 | | 80 | 50 |
| LDPE 662I (weight %) | | 20 | | |
| PS XU70262.08 (weight %) | | 80 | 20 | 50 |
| Bisulfonyl azide (ppm) | | 500 | 500 | 500 |
| Drakeol 34 mineral oil (ppm) | 4000 | 4000 | 4000 | 4000 |
| torque m-g | 5500 | 2400 | 4700 | 3600 |
| melt temp (° C.) | 240 | 233 | 233 | 234 |
| die pressure (psi) | 750 | 200 | 600 | 375 |
| melt index (g/10 min) | 0.5 | 1.1 | 0.22 | 0.48 |
| Melt strength (cN) at 190° C. | 6 | 26 | 18 | 21 |
| Melt elongation (mm/s) at 190° C. | 120 | 315 | 300 | 400 |
| Gel Content (%) | | | | 0.926 |

Examples 35–36

Mixtures of linear low density polyethylene (LLDPE) and polystyrene (PS) were dry blended with 4,4'-oxybis(benzene sulfonyl azide) using 4000 ppm mineral oil as a tackifying agent. The blends were compounded on a 30 mm twin screw extruder at 100 rpm. Temperature settings were: Zone 1—140° C.; zone 2—175° C.; zone 3—200° C.; zone 4—225–215° C.; zone 5—220° C.; die—225° C. The comparative example was a film grade LIDPE that was run with 4000 ppm mineral oil at the same process settings. The data are presented in Table 4. The grafted blends exhibited comparatively higher melt strength and improved melt elongation.

TABLE 4

| Blend Component | Comp. Ex 9 | Ex 35 | Ex 36 |
|---|---|---|---|
| DOWLEX 2045A (weight %) | 100 | 80 | 20 |
| PS XU70262.08 (weight %) | | 20 | 80 |
| Bisulfonyl azide (ppm) | | 300 | 750 |
| Drakeol 34 mineral oil (ppm) | 4000 | 4000 | 4000 |
| Melt Temperature (° C.) | 243 | 243 | 243 |
| Melt Index, I2 (dg/min) | N/A | 0.67 | 0.64 |
| Melt strength (cN) at 190° C. | 4 | 10 | 26 |
| Melt elongation (mm/s) at 190° C. | 175 | 358 | 340 |
| Gel Content (%) | N/A | 0.39 | 0.27 |
| 1% Secant Modulus (psi) | | 58135 | 297967 |
| 2% Secant Modulus (psi) | | 48894 | 280322 |
| Flexural Modulus (psi) | | 70960 | 298835 |

Embodiment Two

Examples 37–39

Mixtures of high density polyethylene (HDPE) and low density polyethylene (LDPE) were dry blended with 4,4'-oxybis(benzene sulfonyl azide) using 4000 ppm mineral oil as a tackifying agent. The blends were compounded on a Leistreitz 18 mm twin screw extruder with LID=30 at 200 rpm. Temperature settings were: Zone 1— 130° C.; zone 2—170° C.; zone 3—190° C.; zone 4—190° C.; zone 5—190° C.; die—190° C. The comparative examples were the individual polymers, or blends thereof, that were run with or without azide and with or without mineral oil at the same process settings. The data are presented in Table 5. In general, the grafted blends exhibited comparatively higher melt strength or melt tension and acceptable melt elongation (>25 mm/s).

TABLE 5

|  | Wt % / Wt % Component A & B | Bisulfonyl Azide (phr) | Mineral Oil (wt %) | Density (g/cc) | Melt Index, I2 (g/10 min.) | 1% secant Modulus psi (kPa) | 2% secant Modulus psi (kPa) | Flexural Modulus psi (kPa) | Melt Tension 190° C. (g) | Melt Tension 160° C. (g) | Melt Strength At 190° C. (cN) | Melt Elongation At 190° C. (mm/s) | Melt Strength 160° C. (c/N) | Melt Elongation 160° C. (mm/s) |
|---|---|---|---|---|---|---|---|---|---|---|---|---|---|---|
| Comp. Ex 10 | 20/80 662I & 10462N | 0 | 0.40% | 0.9539 | 4.923 | 168,162 | 138,889 | 195,144 | 3.64 | 5.87 | 7.7 | 400 | 10.5 | 335 |
| Ex. 37 | 20/80 662I & 10462N | 0.075 | 0.40% | 0.9522 | 1.923 |  |  |  | 8.28 | 9.16 | 12.7 | 190 | 15 | 155 |
| Ex. 38 | 20/80 662I & 10462N | 0.1 | 0.40% | 0.9519 | 1.307 | 144,491 | 118,883 | 171,186 | N/A | N/A | 13 | 115 | 13.5 | 125 |
| Ex. 39 | 20/80 662I & 10462N | 0.15 | 0.40% | 0.9534 | 0.735 |  |  |  | N/A | N/A | 18 | 95 | 18 | 100 |
| Comp. Ex 11 | 100% HDPE 10462N | 0 | 0% | 0.9645 | 8.606 | 227,445 | 190,411 | 248,627 | 0.52 | 0.47 | 0.7 | 380 | 0.9 | 340 |
| Comp. Ex 12 | 100% HDPE 10462N | 0 | 0.40% | 0.9624 | 8.561 | 222,378 | 186,173 | 245,809 | 0.33 | 0.37 | 0.82 | 245 | 1 | 420 |
| Comp. Ex 13 | 100% HDPE 10462N | 0.1 | 0.40% | 0.9612 | 2.849 | 197,204 | 165,783 | 220,950 | 3.78 | 3.9 | N/A | 175 | 4.5 | 290 |
| Comp. Ex 14 | 100% HDPE 10462N | 0.2 | 0.40% | 0.9612 | 1.038 |  |  |  | N/A | 5.69 | 7.5 | 90 | 6.9 | 360 |
| Comp. Ex 15 | 100% HDPE 05862N | 0 | 0% | 0.9633 | 5.162 | 210,393 | 176,554 | 232,033 | 0.75 | 0.79 | 1 | 385 | 1.5 | 410 |
| Comp. Ex 16 | 100% HDPE DSV10305.00 | 0 | 0% | 0.9550 | 1.114 | 161,016 | 132,346 | 192,315 | 2.22 | 2.34 | 4.2 | 175 | 6.9 | 335 |
| Comp. Ex 17 | 100% HDPE HFE-034 | 0 | 0% | 0.9495 | 2.317 | 169,417 | 141,752 | 195,794 | 1.75 | 2.66 | 3.2 | 145 | 4.2 | 325 |

Examples 40–43

A mixture of high density polyethylene (HDPE) and LDPE was dry blended with 4,4'-oxybis(benzene sulfonyl azide) using mineral oil as a tackifying agent. The blend was compounded on a 40 mm twin screw extruder with at 252 rpm and 175 lb/hr. The temperature profile in the extruder was: Zone 2—169° C.; zone 3—189° C.; zone 4—209° C.; zone 5—218° C.; zone 6—227° C.; zone 7—238° C.; zone 8—229° C.; zone 9—216° C.; die—207° C. The final melt temperature was 285° C. The final properties of the blend are presented in Table 6.

TABLE 6

|  | Blend | I2 (g/10 min) | Density (g/cm³) | Melt Strength (cN) at 190° C. | Melt Elongation (mm/s) at 190° C. |
|---|---|---|---|---|---|
| Example 40 | 20% wt % LDPE 662I 80 wt % HDPE 10462N - grafted with 0.075 phr Bisulfonylazide | 0.80 | 0.9528 | 20 | 60 |

This blend was subsequently foamed using an extrusion foaming process with isobutane as blowing agent. The comparative example was a conventional foam made from LDPE 662I. The properties of the resulting foams are summarized in Table 7.

TABLE 7

| | Polymer | Talc (phr) | GMS (phr) | Isobutane (phr) | Foam density (kg/m³)- ASTM D3575- 93 Suffix W Fresh | Foam density (kg/m³)- ASTM D3575- 93 Suffix W 28 days | Open Cells (vol %)- ASTM D2856-87 | 3D average cell size (mm) 7 days | Hardness- 45 days ASTM D2240-97 Asker C |
|---|---|---|---|---|---|---|---|---|---|
| Comp Ex 17 | LDPE 662I | 0.5 | 0.3 | 12 | 26.29 | 29.98 | 70.7 | 1.93 | 26.7 |
| Ex 41 | Grafted Blend of Example 40 | 0.5 | 0.3 | 10 | 33.34 | 34.30 | 42.5 | 2.31 | 38.7 |
| Ex 42 | Grafted Blend of Example 40 | 0.13 | 0.4 | 15 | 23.72 | 24.21 | 33.8 | 1.89 | 35.0 |
| Ex 43 | Grafted Blend of Example 40 | 0.13 | 0.4 | 20 | 19.24 | 20.84 | 26.9 | 1.89 | 36.3 |

Foams of density ranging from about 19 kg/m³ to about 34 kg/m³ were successfully made from grafted blends of HDPE and LDPE. Open cells could be varied from 27 to 43 vol%. The cell sizes of the foams ranged from about 1.9 to 2.3 mm. The Asker C hardness of the foams made from grafted HDPE/LDPE blends was significantly greater than that of the reference foam (Comparative Example 17), even at significantly lower foam density. These data indicate that foams made from grafted HDPE/LDPE blends would exhibit significantly higher load bearing capability relative to foams made from LDPE alone, at similar densities. Or, foams made from grafted HDPE/LDPE blends will have equivalent load bearing capability to LDPE foams, but at comparatively lower foam density.

Examples 44–45

A mixture of high density polyethylene (HDPE) and LDPE was dry blended with 4,4'-oxybis(benzene sulfonyl azide) using 600 ppm mineral oil as a tackifying agent. The blend was compounded on a 40 mm twin screw extruder with at 278 rpm and 175 lb/hr. The temperature profile in the extruder was: Zone 2—176° C.; zone 3—200° C.; zone 4—218° C.; zone 5—232°; zone 6—240° C.; zone 7—250° C.; zone 8—255° C.; zone 9—256° C.; die—254° C. The final melt temperature was 268° C. The final properties of the blend are presented in Table 8.

TABLE 8

| | Blend | I2 (g/10 min) | Density (g/m³) | Melt Strength (cN) at 190° C. | Melt Elongation (mm/s) at 190° C. |
|---|---|---|---|---|---|
| Ex 44 | 20% wt % LDPE 662I 80 wt % HDPE 10462N 0.1 phr Bisulfonylazide | 0.85 | 0.9532 | 16 | 89 |

This blend was subsequently foamed using an extrusion foaming process with isobutane as blowing agent. The comparative example was a conventional foam made from LDPE 620I. The foams were about 38 mm thick. Some of the foams were subsequently perforated (using needles of about 2 mm diameter spaced about 10 mm apart) completely in the vertical/thickness direction and aged at room temperature for at least 7 days before testing foam properties, except open cell contents which were measured on non-perforated foams. The properties of the foams are summarized in Table 9.

TABLE 9

| Test Property | Test Method | Units | direction | Comp Ex 18 Foam from LDPE 620I | Ex 45 Foam from Ex 44 |
|---|---|---|---|---|---|
| Cell Size | | mm | vertical | 2.03 | 1.82 |
| | | | extrusion | 1.41 | 1.55 |
| | | | horizontal | 1.64 | 1.71 |
| | | | average | 1.69 | 1.69 |
| Compression Creep | ASTM D3575-93 Suffix BB | % Linear Change | vertical | 22.0 | 23.1 |
| Compression Deflection | ASTM D3575-93 Suffix D | kPa | | | |
| 5% compression | | | vertical | 17.9 | 13.7 |
| | | | extrusion | 33.6 | 50.2 |
| | | | horizontal | 14.4 | 15.0 |
| 10% compression | | | vertical | 25.9 | 26.3 |
| | | | extrusion | 48.6 | 74.2 |
| | | | horizontal | 20.6 | 23.5 |
| 25% compression | | | vertical | 42.2 | 51.3 |
| | | | extrusion | 62.7 | 88.5 |
| | | | horizontal | 34.8 | 40.4 |
| 50% compression | | | vertical | 91.8 | 100.7 |
| | | | extrusion | 117.7 | 138.6 |
| | | | horizontal | 83.9 | 87.3 |

TABLE 9-continued

| Test Property | Test Method | Units | direction | Comp Ex 18 Foam from LDPE 620I | Ex 45 Foam from Ex 44 |
|---|---|---|---|---|---|
| 75% compression | | | vertical | 255.7 | 257.7 |
| | | | extrusion | 342.2 | 345.1 |
| | | | horizontal | 245.8 | 246.1 |
| Compression Set at 50% compression | ASTM D3575-93 Suffix B | % Linear Change | vertical | 21.7 | 23.6 |
| Density | | kg/m$^3$ | | 25.31 | 33.64 |
| Open Cell | ASTM D2856-94 | Volume % | | 6.84 | 50.70 |
| Thermal Stability 110° C. | ASTM D3575-93 Suffix S | % Linear Change | extrusion | −9.9 | −2.2 |
| | | | horizontal | −7.7 | 3.3 |
| | | | vertical | −2.5 | 6.7 |

The thermal stability data indicate that foams made from the grafted HDPE/LDPE blend exhibited better dimensional stability at 110° C. than the foam of comparative example 18.

Examples 46–55

A series of grafted blends were prepared from HDPE and LDPE using a Leistreitz 18 mm twin screw extruder with L/D=30 at 100 rpm. Temperature settings were: Zone 1—150° C.; zone 2—175° C.; zone 3—200° C.; zone 4—225° C.; zone 5— 225° C.; die—225° C. Final melt temperatures ranged from 237° C. to 244° C. The comparative examples were the blends that were run without grafting agent and without mineral oil at the same process settings. The grafting agents used were with 4,4'-oxybis(benzene sulfonyl azide) and Lupersol™ 130 (2,5-dimethyl-2,5-di-(t-butylperoxy)hexyne-3), the latter a trademark and product of Elf Atochem.

The data, summarized in Table 10, indicate that grafted blends HDPE/LDPE exhibit increased melt strength and a melt elongation greater than 25 mm/s enabling subsequent fabrication of the improved articles of the present invention.

TABLE 10

| Example | wt % / wt % Component A & Component B & Component C | Mineral Oil (%) | Bisulfonyl Azide (phr) | Lupersol 130 (phr) | Density (g/cm$^3$) | Gel Content (%) | Melt Strength (cN) 190° C. | Melt Elongation (mm/s) 190° C. |
|---|---|---|---|---|---|---|---|---|
| Comp Ex 19 | 80/20 HDPE 10462N & LDPE 662I | 0 | 0 | 0 | 0.9538 | 0.470 | 6 | 350 |
| Comp Ex 20 | 85/15 HDPE DSV10305.00 & LDPE 620I | 0 | 0 | 0 | 0.9505 | 0.460 | 8 | 200 |
| Ex. 46 | 80/20 HDPE 10462N & LDPE 662I | 0.4 | 0.05 | 0 | 0.9528 | 0.343 | 7.5 | 200 |
| Ex. 47 | 80/20 HDPE 10462N & LDPE 662I | 0.4 | 0.1 | 0 | 0.9526 | 0.292 | 9 | 140 |
| Ex. 48 | 79.4/20/0.6 HDPE 10462N & LDPE 662I & EG8200 | 0 | 0.05 | 0 | 0.9532 | 0.436 | 7.5 | 175 |
| Ex. 49 | 78.8/20/1.2 HDPE 10462N & LDPE 662I & EG8200 | 0 | 0.1 | 0 | 0.9519 | 0.582 | 9 | 155 |
| Ex. 50 | 78.1/20/1.9 HDPE 10462N & LDPE 662I & EG8200 | 0 | 0.15 | 0 | 0.9511 | 0.382 | 11 | 67 |
| Ex. 51 | 77.5/20/2.5 HDPE 10462N & LDPE 662I & EG8200 | 0 | 0.2 | 0 | 0.9513 | 0.169 | 13 | 57 |
| Ex. 52 | 74.7/25/0.3 HDPE DSV10305.00 & LDPE 620I & EG8200 | 0 | 0.025 | 0 | 0.9468 | 0.310 | 22 | 43 |
| Ex. 53 | 74.4/25/0.6 HDPE DSV10305.00 & LDPE 620I & EG8200 | 0 | 0.05 | 0 | 0.9457 | 0.410 | 27 | 38 |
| Ex. 54 | 80/20 HDPE 10462N & LDPE 662I | 0 | 0 | 0.1 | 0.9489 | 0.680 | 24 | 57 |
| Ex. 55 | 85/15 HDPE DSV10305.00 & LDPE 620I | 0 | 0 | 0.1 | 0.9478 | 0.510 | 46 | 36 |

Examples 56–61

A series of grafted blends similar in polymer composition to Examples 46 and 47 were made using a Leistreitz 18 mm twin screw extruder with L/D=30 at 125 rpm. Temperature settings were: Zone 1—150° C.; zone 2—175° C.; zone 3—200° C.; zone 4—225° C.; zone 5—225° C.; die—225° C. The comparative example was LLDPE that was run without grafting agent at the same process settings. The data are summarized in Table 11.

The grafted blends of Examples 56–58 exhibited higher melt strength and elongation than Comparative Example 21, at relatively higher melt index. That is, the grafted blends of Examples 56–58 would exhibit better processability in applications requiring high melt strength. Additionally, the modulus and upper service temperature of the grafted blends of Examples 56–58 would be significantly greater than that of the LLDPE resin.

The grafted blends of Examples 59–61 exhibited even higher melt strength, with acceptable melt elongation, at very low melt index. The gel content was still very low.

Examples 62–65

A series of grafted blends were prepared from HDPE and LDPE using a 30 mm twin screw extruder at 100 rpm. Temperature settings were: Zone 1—140° C.; zone 2—175° C.; zone 3—200° C.; zone 4—215° C.; zone 5—220° C.; die-255° C. Comparisons were made with LDPE (Comparative Example 22) and HDPE (Comparative Example 23) of similar melt index. The data are summarized in Table 12.

The grafted blend of Example 62 exhibited significantly higher modulus than Comparative Example 22 of similar melt index (0.8 dg/min) and identical melt strength (12 cN).

The grafted blend of Example 65 exhibited significantly higher melt strength than Comparative Example 23 of similar melt index (1 dg/min) and density (0.953-0.955 g/cm³). That is, the grafted blends of this invention exhibit processability similar to branched resins (e.g., LDPE) with modulus and upper service temperature similar to that of linear polyethylene.

TABLE 11

|  | Comp Ex 21 | Ex 56 | Ex 57 | Ex 58 | Ex 59 | Ex 60 | Ex 61 |
|---|---|---|---|---|---|---|---|
| LLDPE XUS61528.29 (wt %) | 100 | | | | | | |
| HDPE 10462N (wt %) | | 80 | 80 | 80 | 80 | 80 | 80 |
| LDPE 662I (wt %) | | 20 | 20 | 20 | 20 | 20 | 20 |
| Bisulfonyl azide (ppm) | | 500 | 750 | 1000 | | | |
| Lupersol 130 (ppm) | | | | | 1000 | 1500 | 2000 |
| Drakeol 34 mineral oil (ppm) | 4000 | 4000 | 4000 | 4000 | 4000 | 4000 | 4000 |
| torque m-g | 5500 | 3600 | 3500 | 3600 | 6000 | 6700 | 7500 |
| melt temp (° C.) | 240 | 235 | 236 | 239 | 239 | 240 | 241 |
| die pressure (psi) | 750 | 325 | 375 | 400 | 875 | 1100 | 1350 |
| Nominal density (g/cm³) | 0.919 | 0.953 | 0.953 | 0.953 | 0.953 | 0.953 | 0.953 |
| melt index (g/10 min) | 0.5 | 2.71 | 1.97 | 1.47 | 0.07 | 0.01 | 0.01 |
| Melt strength (cN) at 190° C. | 6 | | 8 | 9 | 24 | 32 | 47 |
| Melt elongation (mm/s) at 190° C. | 120 | | 175 | 160 | 60 | 44 | 40 |
| Gel Content (%) | | | | 0.74 | | | 0.797 |

The data in Table 11 indicate that grafted blends HDPE/LDPE exhibit increased melt strength and a melt elongation greater than 25 mm/s enabling subsequent fabrication of the improved articles of the present invention.

TABLE 12

|  | Comp Ex 22 | Comp Ex 23 | Ex 62 | Ex 63 | Ex 64 | Ex 65 |
|---|---|---|---|---|---|---|
| LDPE XSS84812.06 | 100 | | | | | |
| HDPE DSV10305.00 (wt %) | | 100 | | | | |
| HDPE 10462N (wt %) | | | 80 | 80 | 80 | 80 |
| LDPE 662I (wt %) | | | 20 | 20 | 20 | |
| LDPE 620I | | | | | | 20 |
| Bisulfonyl azide (ppm) | none | none | 1000 | | | |
| Lupersol 130 peroxide (ppm) | none | none | | 150 | 300 | 300 |
| Drakeol 34 mineral oil (ppm) | none | none | 4000 | 4000 | 4000 | 4000 |
| Melt Temperature (° C.) | N/A | N/A | 243 | 242 | 243 | 241 |
| Melt Index, 12 (dg/min) | 0.83 | 1.09 | 0.82 | 1.71 | 0.64 | 1.04 |
| Melt strength (cN) at 190° C. | 12 | 4.3 | 12 | 9 | 13 | 8 |
| Melt elongation (mm/s) at 190° C. | 180 | 110 | 140 | 225 | 95 | 170 |
| Gel Content (%) | N/A | 0.95 | 0.41 | 0.45 | 0.44 | 0.39 |
| Density (g/cm³) | 0.9236 | 0.9547 | 0.9531 | 0.9523 | 0.9517 | 0.9529 |
| 1% Secant Modulus (psi) | 54842 | 166823 | 136301 | 136360 | 129390 | 135065 |
| 2% Secant Modulus (psi) | 47371 | 140395 | 117612 | 115239 | 109004 | 114069 |
| Flexural Modulus (psi) | 62903 | 195851 | 145518 | 154459 | 146327 | 154952 |

Example 66

The grafted blend of Example 44 was further blended with an ethylene styrene interpolymer (ESI 4) at a 70:30 wt % ratio and subsequently foamed using an extrusion foaming process with isobutane as blowing agent. The comparative example was a conventional foam made from LDPE 6201. The foams were about 38 mm thick. Some of the foams were subsequently perforated (using needles of about 2 mm diameter spaced about 10 mm apart) completely in the vertical/thickness direction and aged at room temperature for at least 7 days before testing foam properties, except open cell contents which were measured on non-perforated foams. The properties of the foams are summarized in Table 13.

a Leistreitz 18 mm twin screw extruder with L/D=30 at 125 rpm. Temperature settings were: Zone 1—150° C.; zone 2—175° C.; zone 3—200° C.; zone 4—225° C.; zone 5—225° C.; die—225° C. The comparative example was a film grade LLDPE that was run with 4000 ppm mineral oil at the same process settings. The data are presented in Table 14. The grafted blends exhibited comparatively higher melt strength and acceptable melt elongation (>25 mm/s). Furthermore, the grafted blends of Examples 67–68 are expected to exhibit relatively higher modulus and upper service temperature than Comparative Example 25 because of the polypropylene used.

TABLE 13

| Test Property | Test Method | Units | Direction | Comp Ex 24 Foam made from LDPE 620I | Ex 66 Foam Made from 70/30 Blend of Grafted Blend of Example 44 & ESI 4 |
|---|---|---|---|---|---|
| Cell Size | | mm | Vertical | 2.03 | 1.82 |
| | | | Extrusion | 1.41 | 1.41 |
| | | | Horizontal | 1.64 | 1.47 |
| | | | Average | 1.69 | 1.57 |
| Compression Deflection | ASTM D3575-93 Suffix D | kPa | | | |
| 5% compression | | | Vertical | 17.9 | 14.3 |
| | | | Extrusion | 33.6 | 31.2 |
| | | | Horizontal | 14.4 | 13.6 |
| 10% compression | | | Vertical | 25.9 | 21.2 |
| | | | Extrusion | 48.6 | 42.7 |
| | | | Horizontal | 20.6 | 18.8 |
| 25% compression | | | Vertical | 42.2 | 35.5 |
| | | | Extrusion | 62.7 | 52.6 |
| | | | Horizontal | 34.8 | 28.1 |
| 50% compression | | | Vertical | 91.8 | 71.0 |
| | | | Extrusion | 117.7 | 89.3 |
| | | | Horizontal | 83.9 | 59.5 |
| 75% compression | | | Vertical | 255.7 | 183.7 |
| | | | Extrusion | 342.2 | 229.9 |
| | | | Horizontal | 245.8 | 165.9 |
| Compression Set at 50% Compression | ASTM D3575-93 Suffix B | % Linear Change | Vertical | 21.7 | 18.4 |
| Density | | kg/m$^3$ | | 25.31 | 25.47 |
| Open Cells | ASTM D2856-94 | Volume % | | 6.84 | 40.62 |
| Thermal Stability at 110° C. | ASTM D3575-93 Suffix S | % Linear Change | Extrusion | −9.9 | −2.8 |
| | | | Horizontal | −7.7 | −3.1 |
| | | | Vertical | −2.5 | 1.7 |

Blending ESI with a grafted HDPE/LDPE blend results in foams that exhibit lower compression set and better thermal stability (dimensional stability) at 110° C. than the foam of comparative example 24.

Embodiment 3

Examples 67–69

Mixtures of linear low density polyethylene (LLDPE) and polypropylene (PP), or mixtures of low density polyethylene (LDPE) and PP, were dry blended with various loadings of 4,4'-oxybis(benzene sulfonyl azide) using 4000 ppm mineral oil as a tackifying agent. The blends were compounded on

TABLE 14

| | Comp. Ex 25 | Ex 67 | Ex 68 | Ex 69 |
|---|---|---|---|---|
| LLDPE XUS61528.29 (wt %) | 100 | 80 | 80 | |
| LDPE 662I (wt %) | | | | 80 |
| PP H700-12 (wt %) | | 20 | 20 | 20 |
| Bisulfonyl azide (ppm) | | 250 | 500 | 500 |
| Drakeol 34 mineral oil (ppm) | 4000 | 4000 | 4000 | 4000 |
| torque m-g | 5500 | 4200 | 5000 | 3500 |
| melt temp (° C.) | 240 | 231 | 241 | 237 |
| die pressure (psi) | 750 | 500 | 700 | 600 |
| melt index (g/10 min) | 0.5 | 0.36 | 0.1 | 0.13 |
| Melt strength (cN) at 190° C. | 6 | 10 | 23 | 40 |

TABLE 14-continued

|  | Comp. Ex 25 | Ex 67 | Ex 68 | Ex 69 |
|---|---|---|---|---|
| Melt elongation (mm/s) at 190° C. | 120 | 100 | 58 | 38 |
| Gel Content (%) |  |  | 0.501 | 0.771 |

Example 70

A mixture of linear low density polyethylene (LLDPE) and polypropylene (PP) was dry blended with 4,4'-oxybis (benzene sulfonyl azide) using 4000 ppm mineral oil as a tackifying agent. The blend was compounded on a 30 mm twin screw extruder at 100 rpm. Temperature settings were: Zone 1—140° C.; zone 2—175° C.; zone 3—200° C.; zone 4— 215° C.; zone 5—220° C.; die—225° C. The comparative example was a film grade LLDPE that was run with 4000 ppm mineral oil at the same process settings. The data are presented in Table 15. The grafted blends exhibited comparatively higher melt strength and acceptable melt elongation (>25 mm/s).

TABLE 15

|  | Comp. Ex 26 | Ex 70 |
|---|---|---|
| DOWLEX 2045A (wt %) | 100 | 80 |
| PP H700-12 (wt %) |  | 20 |
| Bisulfonyl azide (ppm) |  | 300 |
| Drakeol 34 mineral oil (ppm) | 4000 | 4000 |
| Melt Temperature (° C.) | 243 | 240 |
| Melt Index, I2 (dg/min) | N/A | 0.59 |
| Melt strength (cN) at 190° C. | 4 | 8 |
| Melt elongation (mm/s) at 190° C. | 175 | 100 |
| Gel Content (%) | N/A | 0.41 |
| 1% Secant Modulus (psi) |  | 57495 |
| 2% Secant Modulus (psi) |  | 50412 |
| Flexural Modulus (psi) |  | 64321 |

What is claimed is:

1. A foam comprising a grafted blend composition comprising,
   (A) one or more homopolymers or interpolymers with peak crystalline melting temperature (Tm) and/or or glass transition temperature (Tg by DSC) of 90° C. or more;
   (B) one or more homopolymers or interpolymers with peak crystalline melting temperature (Tm) and/or glass transition temperature (Tg by DSC) of 80° C. or less; and
   (C) at least one coupling agent;
   and wherein
   1) the upper service temperature of said grafted blend is greater than about 80° C.;
   2) the gel content of said grafted blend is 50 percent or less (as determined by insolubility of the gels in boiling xylene when tested according to ASTM D-2765A-84);
   3) said grafted blend composition exhibits at least one of the following improvements relative to the same blend in the absence of Component C:
      (a) the melt strength is increased by 5% or more; and/or
      (b) the upper service temperature is increased by 0.5° C. or more;
   and wherein said foam has a crosslinked gel content of 50 percent or less, and a density less than 900 kilograms per cubic meter.

2. The foam of claim 1 having a crosslinked gel content of 30 percent or less, and a density less than 850 kilograms per cubic meter.

3. The foam of claim 1 having a crosslinked gel content of 10 percent or less, and a density ranging from 5 to 700 kilograms per cubic meter.

4. The foam of claim 1 having a crosslinked gel greater than 50 percent, and a density less than 900 kilograms per cubic meter.

5. The foam of claim 1 having a crosslinked gel greater than 55 percent, and a density less than 850 kilograms per cubic meter.

6. The foam of claim 1 having a crosslinked gel greater than 60 percent, and a density ranging from 5 to 700 kilograms per cubic meter.

7. The foam of claims 1 to 6, wherein the foam has an open cell content of 30 volume percent or less.

8. The foam of claims 1 to 6, wherein the foam has an open cell content of 20 volume percent or less.

9. The foam of claims 1 to 6, wherein the foam has an open cell content of 10 volume percent or less.

10. The foam of claims 1 to 6, wherein the foam has an open cell content of greater than 30 volume percent.

11. The foam of claims 1 to 6, wherein the foam has an open cell content of greater than 40 volume percent.

12. The foam of claim 1 to 6, wherein the foam has an open cell content of greater than 50 volume percent.

13. The foam of claim 1, wherein the foam has defined therein a multiplicity of channels, the channels being free of direction with respect to the longitudinal extension of the foam and enhancing or accelerating a gaseous permeation exchange wherein blowing agent exits from the foam and air enters into the foam.

14. The foam of claim 1, wherein the foam is in the shape of a sheet or plank with a thickness of at least 0.5 millimeters and width of at least 5 millimeters, or a rod having a diameter of at least 5 millimeters.

15. The foam of claim 1, wherein the foam is shaped as thermoplastic foam beads or as expanded and fused thermoplastic foam beads.

16. The foam of claim 1, wherein the foam is a unitary foam structure that is a coalesced strand foam.

17. A foam comprising a grafted blend composition comprising,
   (A) a blend of
      1) one or more linear or substantially linear ethylene homopolymers or interpolymers and one or more branched ethylene homopolymers or interpolymers;
      2) one or more linear or substantially linear ethylene homopolymers or interpolymers and one or more substantially random interpolymers; or
      3) one or more linear or substantially linear ethylene homopolymers or interpolymers, one or more branched ethylene homopolymers or interpolymers and one or more substantially random interpolymers; and
   (B) one or more coupling agents;
   and wherein said grafted blend composition has
      a) a melt strength, greater than about 8cN;
      b) a melt elongation of 20 mm/s or greater;
      c) a flexural modulus of 80,000 psi or greater; and
      d) a gel content which is 50 percent or less, as determined by insolubility of the gels in boiling xylene when tested according to ASTM D-2765A-84;
   and wherein said foam has a crosslinked gel content of 50 percent or less, and a density less than 900 kilograms per cubic meter.

18. A foam comprising a grafted blend composition comprising,
  (A) one or more olefinic polymers other than polypropylene;
  (B) one or more propylene homopolymers or interpolymers; and
  (C) at least one coupling agent;
  and wherein said grafted blend has
    1) a gel content which is 50 percent or less, as determined by insolubility of the gels in boiling xylene when tested according to ASTM D-2765A-84;
    2) a melt elongation greater than or equal to about 20 mm/s,
    3) a melt strength greater than about 5 cN; and
    4) a flexural modulus of 50,000 psi or greater; and
  and wherein said foam has a crosslinked gel content of 50 percent or less, and a density less than 900 kilograms per cubic meter.

19. The foam of claims 17 and 18 wherein said grafted blend composition further comprises from about 0.1 to about 99.9 wt percent of a thermoplastic polymer.

* * * * *